US012703809B2

(12) United States Patent
Hoshi et al.

(10) Patent No.: US 12,703,809 B2
(45) Date of Patent: Aug. 11, 2026

(54) METHOD FOR PRODUCING PRODUCT, ADHESIVE COMPOSITION AND FOAMING ADHESIVE SHEET

(71) Applicant: DAI NIPPON PRINTING CO., LTD., Tokyo-to (JP)

(72) Inventors: Kentaro Hoshi, Tokyo-to (JP); Izumi Hasegawa, Tokyo-to (JP); Shinya Shimada, Tokyo-to (JP); Junko Kodani, Tokyo-to (JP); Nobuyuki Kanda, Tokyo-to (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 50 days.

(21) Appl. No.: 18/874,343

(22) PCT Filed: May 12, 2023

(86) PCT No.: PCT/JP2023/017855

§ 371 (c)(1),
(2) Date: Dec. 12, 2024

(87) PCT Pub. No.: WO2024/236618

PCT Pub. Date: Nov. 21, 2024

(65) Prior Publication Data

US 2025/0368861 A1 Dec. 4, 2025

(51) Int. Cl.

| | |
|---|---|
| ***C09J 5/08*** | (2006.01) |
| ***C08J 9/228*** | (2006.01) |
| ***C09J 5/06*** | (2006.01) |
| ***C09J 7/35*** | (2018.01) |
| ***C09J 163/00*** | (2006.01) |

(52) U.S. Cl.
CPC ................. *C09J 5/08* (2013.01); *C08J 9/228* (2013.01); *C09J 5/06* (2013.01); *C09J 7/35* (2018.01); *C09J 163/00* (2013.01); *C08J 2203/22* (2013.01); *C09J 2301/304* (2020.08); *C09J 2301/408* (2020.08); *C09J 2301/412* (2020.08); *C09J 2400/24* (2013.01)

(58) Field of Classification Search
CPC ......... C09J 5/08; C09J 7/35; C08J 5/06; C08J 9/228; C08J 2203/22
See application file for complete search history.

(56) References Cited

U.S. PATENT DOCUMENTS

2016/0340555 A1 11/2016 Ueki

FOREIGN PATENT DOCUMENTS

| | | | | |
|---|---|---|---|---|
| JP | 6223477 B2 | 11/2017 | | |
| JP | 2019-203062 A | 11/2019 | | |
| JP | 2021155495 A | * 10/2021 | ............ | C09J 201/00 |
| JP | 7280986 B1 | 5/2023 | | |
| WO | 2019/226819 A1 | 11/2019 | | |

* cited by examiner

*Primary Examiner* — Daniel McNally
(74) *Attorney, Agent, or Firm* — Oliff PLC

(57) ABSTRACT

A method for producing a product, the method including: a placing step of placing an adhesive composition, including a thermosetting resin and a foaming agent, between a first member and a second member; and an adhering step of adhering the first member and the second member by foaming and curing the adhesive composition by heating, wherein the foaming agent is a thermally expandable microcapsule; the adhesive composition has predetermined properties; and the adhesive composition is heated under predetermined heating conditions in the adhering step.

5 Claims, 8 Drawing Sheets

Heat flow (μW/mg)

Time

METHOD FOR PRODUCING PRODUCT, ADHESIVE COMPOSITION AND FOAMING ADHESIVE SHEET

TECHNICAL FIELD

The present disclosure relates to a method for producing a product, and an adhesive composition and a foaming adhesive sheet used therein.

BACKGROUND ART

An adhesive that adheres members to each other is used in various fields, and a lot of methods for adhering thereof have been known.

Recently, use of an adhesive composition including a foaming agent has been proposed (for example, Patent Documents 1 and 2).

CITATION LIST

Patent Documents

Patent Document 1: Japanese Patent No. 6223477

Patent Document 2: Japanese Patent Application Laid-Open (JP-A) No. 2019-203062

SUMMARY OF DISCLOSURE

Technical Problem

In relation to an adhesive composition including a foaming agent, for example, Patent Document 1 discloses heating conditions satisfying a relation of $T1 \leq T2$, when the thermal foaming temperature (foaming start temperature) of a thermal foaming agent is regarded as T1 and the curing start temperature of an adhesive layer is regarded as T2.

However, as the result of intensive studies about the heating conditions of the adhesive composition including a foaming agent, the inventors of the present disclosure have found out that, even when the foaming start temperature of a foaming agent and the curing start temperature of an adhesive layer have a predetermined relationship, the adhesive strength may decrease in some cases. When the adhesive strength decreases, there is a problem that the reliability and durability of the members adhered by the adhesive composition including a foaming agent are inferior.

The present disclosure has been made in view of the above circumstances, and a main object thereof is to provide a method for producing a product capable of improving adhesive strength, and an adhesive composition and a foaming adhesive sheet used therein.

Solution to Problem

One embodiment of the present disclosure provides a method for producing a product, the method comprising: a placing step of placing an adhesive composition, including a thermosetting resin and a foaming agent, between a first member and a second member; and an adhering step of adhering the first member and the second member by foaming and curing the adhesive composition by heating, wherein the foaming agent is a thermally expandable microcapsule; $A<B$ when following conditions are satisfied, in a foaming ratio-time curve where time is on a horizontal axis and a foaming ratio of the foaming agent is on a vertical axis, when a differential scanning calorimetry is carried out to the foaming agent, using a differential scanning calorimeter including a camera, under heating conditions in the adhering step, a slope of a tangent line to the curve at a top of a peak, on a longer time side of the peak, is regarded as A, and in a DSC curve where time is on a horizontal axis and a heat flow is on a vertical axis, when a differential scanning calorimetry is carried out to the adhesive composition under the heating conditions in the adhering step, a slope of a tangent line to the curve at a top of an exothermic peak, on a longer time side of the exothermic peak, is regarded as B; and the adhesive composition is heated so that $T1<T2$ when following conditions are satisfied in the adhering step, in a foaming ratio-time curve where time is on a horizontal axis and a foaming ratio of the foaming agent is on a vertical axis, when a differential scanning calorimetry is carried out to the foaming agent, using a differential scanning calorimeter including a camera, time corresponding to a top of a peak is regarded as T1, and in a DSC curve where time is on a horizontal axis and a heat flow is on a vertical axis, when a differential scanning calorimetry is carried out to a composition where the foaming agent is excluded from the adhesive composition, time corresponding to a top of an exothermic peak is regarded as T2.

Another embodiment of the present disclosure provides an adhesive composition comprising a thermosetting resin and a foaming agent, wherein the foaming agent is a thermally expandable microcapsule; $C<D$ when following conditions are satisfied, in a foaming ratio-time curve where time is on a horizontal axis and a foaming ratio of the foaming agent is on a vertical axis, when a differential scanning calorimetry is carried out to the foaming agent, using a differential scanning calorimeter including a camera, under heating conditions of rising temperature from room temperature to a maximum foaming temperature of the foaming agent in 5 minutes, and holding at the maximum foaming temperature of the foaming agent, a slope of a tangent line to the curve at a top of a peak, on a longer time side of the peak, is regarded as C, and in a DSC curve where time is on a horizontal axis and a heat flow is on a vertical axis, when a differential scanning calorimetry is carried out to the adhesive composition under the heating conditions described above, a slope of a tangent line to the curve at a top of an exothermic peak, on a longer time side of the exothermic peak, is regarded as D; and the adhesive composition is used by heating thereof so that $T1<T2$ when following conditions are satisfied, in a foaming ratio-time curve where time is on a horizontal axis and a foaming ratio of the foaming agent is on a vertical axis, when a differential scanning calorimetry is carried out to the foaming agent, using a differential scanning calorimeter including a camera, time corresponding to a top of a peak is regarded as T1, and in a DSC curve where time is on a horizontal axis and a heat flow is on a vertical axis, when a differential scanning calorimetry is carried out to a composition where the foaming agent is excluded from the adhesive composition, time corresponding to a top of an exothermic peak is regarded as T2.

Also, another embodiment of the present disclosure provides a foaming adhesive sheet comprising an adhesive layer, wherein the adhesive layer includes the adhesive composition described above.

Advantageous Effects of Disclosure

The method for producing a product in the present disclosure exhibits an effect that it is capable of improving the adhesive strength.

DESCRIPTION OF EMBODIMENTS

Figure 1A:
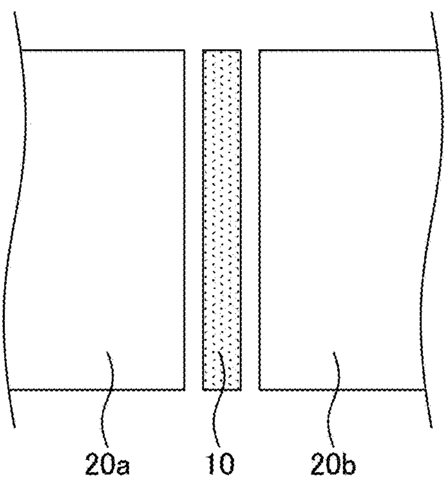
FIGS. 1A and 1B are process drawings illustrating an example of a method for producing a product in the present disclosure.

Embodiments in the present disclosure are hereinafter explained with reference to, for example, drawings. However, the present disclosure is enforceable in a variety of different forms, and thus should not be taken as is limited to the contents described in the embodiments exemplified as below. Also, the drawings may show the features of the present disclosure such as width, thickness, and shape of each part schematically comparing to the actual form in order to explain the present disclosure more clearly in some cases; however, it is merely an example, and thus does not limit the interpretation of the present disclosure. Also, in the present description and each drawing, for the factor same as that described in the figure already explained, the same reference sign is indicated and the detailed explanation thereof may be omitted.

In the present descriptions, in expressing an aspect wherein some member is placed on the other member, when described as merely “on” or “below”, unless otherwise stated, it includes both of the following cases: a case wherein some member is placed directly on or directly below the other member so as to be in contact with the other member, and a case wherein some member is placed on the upper side or the lower side of the other member via yet another member. Also, in the present descriptions, on the occasion of expressing an aspect wherein some member is placed on the surface of the other member, when described as merely “on the surface side” or “on the surface”, unless otherwise stated, it includes both of the following cases: a case wherein some member is placed directly on or directly below the other member so as to be in contact with the other member, and a case wherein some member is placed on the upper side or the lower side of the other member via yet another member.

Also, in the present descriptions, a member referred to as “film” is included in “sheet”. Also, a member referred to as “sheet” is included in “film”. Also, a number range in the present descriptions is a range of an average value.

A method for producing a product, and an adhesive composition and a foaming adhesive sheet used therein in the present disclosure will be hereinafter described in detail.

A. Method for Producing Product

The method for producing a product in the present disclosure comprises: a placing step of placing an adhesive composition, including a thermosetting resin and a foaming agent, between a first member and a second member; and an adhering step of adhering the first member and the second member by foaming and curing the adhesive composition by heating, wherein the foaming agent is a thermally expandable microcapsule; $A<B$ when following conditions are satisfied, in a foaming ratio-time curve where time is on a horizontal axis and a foaming ratio of the foaming agent is on a vertical axis, when a differential scanning calorimetry is carried out to the foaming agent, using a differential scanning calorimeter including a camera, under heating conditions in the adhering step, a slope of a tangent line to the curve at a top of a peak, on a longer time side of the peak, is regarded as A, and in a DSC curve where time is on a horizontal axis and a heat flow is on a vertical axis, when a differential scanning calorimetry is carried out to the adhesive composition under the heating conditions in the adhering step, a slope of a tangent line to the curve at a top of an exothermic peak, on a longer time side of the exothermic peak, is regarded as B; and the adhesive composition is heated so that $T1<T2$ when following conditions are satisfied in the adhering step, in a foaming ratio-time curve where time is on a horizontal axis and a foaming ratio of the foaming agent is on a vertical axis, when a differential scanning calorimetry is carried out to the foaming agent, using a differential scanning calorimeter including a camera, time corresponding to a top of a peak is regarded as T1, and in a DSC curve where time is on a horizontal axis and a heat flow is on a vertical axis, when a differential scanning calorimetry is carried out to a composition where the foaming agent is excluded from the adhesive composition, time corresponding to a top of an exothermic peak is regarded as T2.

Figure 1B:
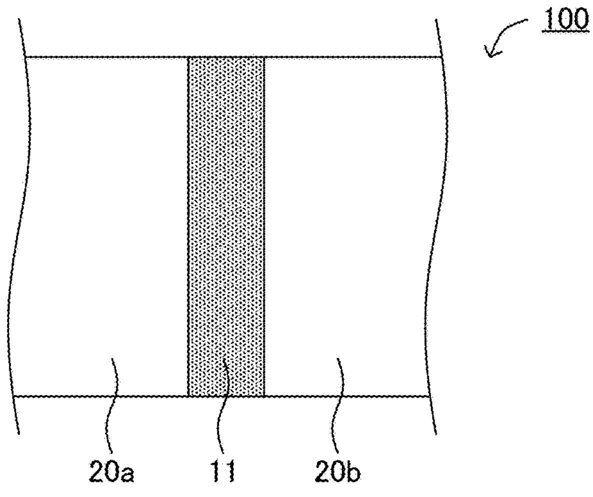
Figure 2:
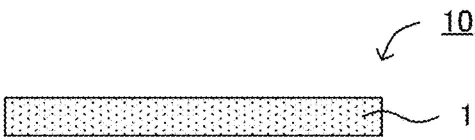
FIG. 2 is a schematic cross-sectional view illustrating an example of a foaming adhesive sheet in the present disclosure.

The method for producing a product in the present disclosure is explained, referring to drawings. FIGS. 1A and 1B are process drawings illustrating an example of a method for producing a product in the present disclosure. Also, FIGS. 1A and 1B are an example of a method for producing a product using the foaming adhesive sheet illustrated in FIG. 2. As shown in FIG. 2, the foaming adhesive sheet 10 includes an adhesive layer 1 including an adhesive composition including a thermosetting resin and a foaming agent. Firstly, in the method for producing a product, foaming adhesive sheet 10 is placed between a first member 20*a* and a second member 20*b*, as shown in FIG. 1A. Then, as shown in FIG. 1B, the adhesive composition included in the adhesive layer of the foaming adhesive sheet 10 is foamed and cured by heating. The first member 20*a* and the second member 20*b* are adhered (joined) by adhesive sheet 11 after foamed and cured. Thereby, obtaining product 100 wherein the adhesive sheet 11 is placed between the first member 20*a* and the second member 20*b*.

Figures 3, 4:
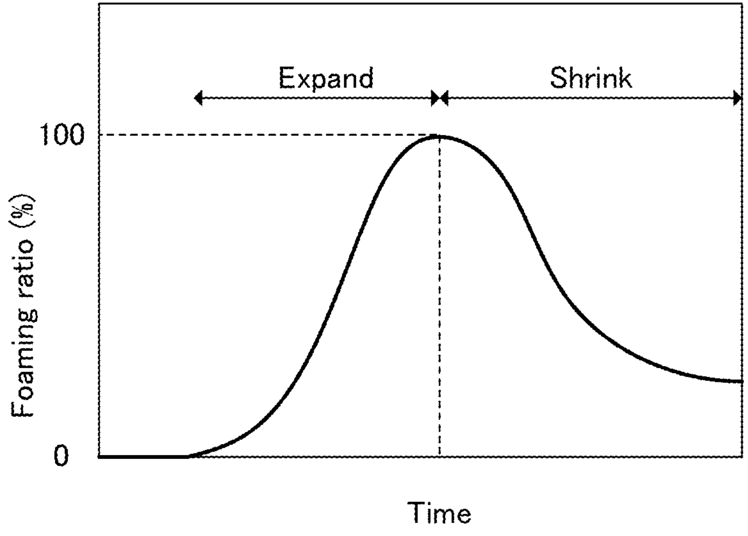
FIG. 3 is a graph illustrating an example of the foaming ratio-time curve for the foaming agent.
FIG. 4 is a graph illustrating an example of the DSC curve for the adhesive composition.

In the present disclosure, the foaming agent is a thermally expandable microcapsule, and a thermal expansion agent such as hydrocarbon is included in a shell formed on resin. Here, in a thermally expandable microcapsule, when heated, the resin constituting the shell softens and the pressure of the thermal expansion agent such as hydrocarbon increases, so that the thermally expandable microcapsule expands. Since the shell becomes thinner due to the expansion, when it is further heated, the thermal expansion agent escapes from the thermally expandable microcapsule, causing the thermally expandable microcapsule to shrink. Therefore, when a differential scanning calorimetry is carried out to the foaming agent, using a differential scanning calorimeter including a camera, under the heating conditions in the adhering step, a foaming ratio-time curve where time is on a horizontal axis and a foaming ratio of the foaming agent is on a vertical axis, as shown in FIG. 3 for example, is obtained.

Also, in the present disclosure, the adhesive composition includes a thermosetting resin. Therefore, in a DSC curve where time is on a horizontal axis and a heat flow is on a vertical axis, when a differential scanning calorimetry is carried out to the adhesive composition under the heating conditions in the adhering step, an exothermic peak due to the curing reaction of the thermosetting resin, as shown in FIG. 4 for example, is observed.

Figure 5:
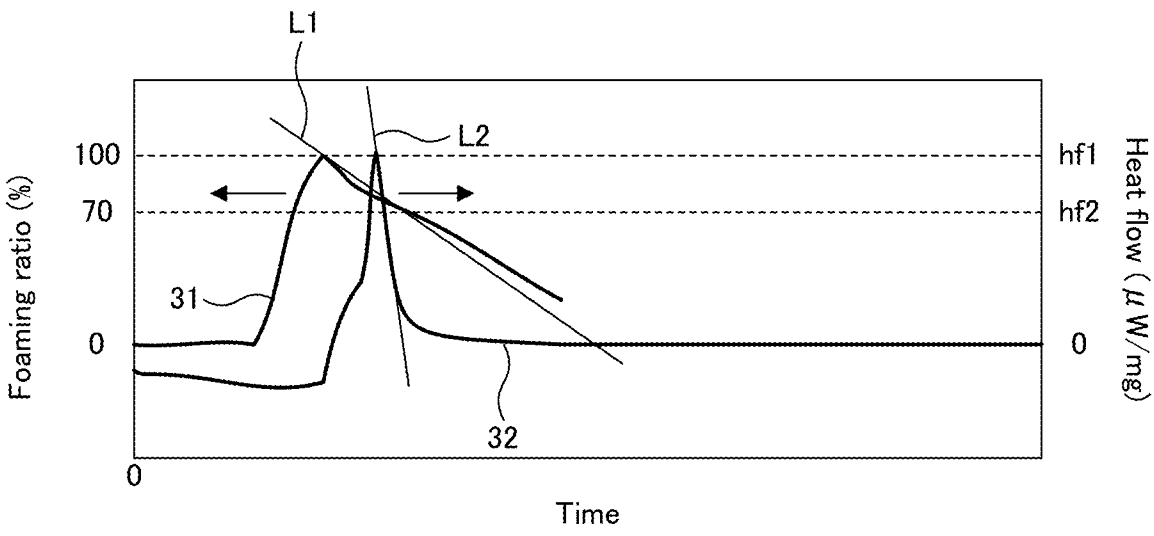
FIG. 5 is a graph illustrating an example of the foaming ratio-time curve for the foaming agent and the DSC curve for the adhesive composition.

FIG. 5 is a graph overlaying the foaming ratio-time curve where time is on a horizontal axis and a foaming ratio of the foaming agent is on a vertical axis when a differential scanning calorimetry is carried out to the foaming agent, using a differential scanning calorimeter including a camera, under the heating conditions in the adhering step, on the DSC curve where time is on a horizontal axis and a heat flow is on a vertical axis, when a differential scanning calorimetry is carried out to the adhesive composition under the heating conditions in the adhering step. As shown in FIG. 5, in the foaming ratio-time curve 31 for the foaming agent, the slope of the tangent line L1 to the curve at the top of the peak, on the longer time side of the peak, is regarded as A. Also, in a DSC curve 32 for the adhesive composition, the slope of the tangent line L2 to the curve at the top of the exothermic peak, on the longer time side of the exothermic peak, is regarded as B. When the conditions described above are satisfied, A<B.

In the present disclosure, since A<B, the curing reaction of the thermosetting resin may be proceeded before the shrinkage of the foaming agent is proceeded so that the thermosetting resin may be cured sufficiently. Therefore, the thickness of the adhesive layer during foaming may be maintained so that the adhesive strength may be improved.

Meanwhile, when A≥B, the shrinkage of the foaming agent is proceeded before the curing reaction of the thermosetting resin is proceeded. Therefore, the thickness of the adhesive layer during foaming cannot be maintained so that the adhesive strength may be deteriorated.

Figure 6:
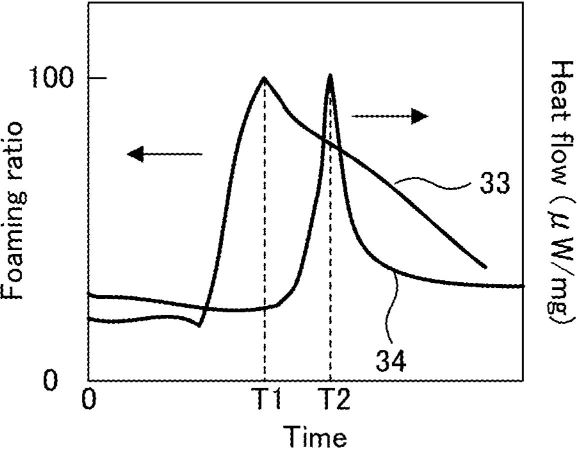
FIG. 6 is a graph illustrating an example of the foaming ratio-time curve for the foaming agent and the DSC curve for the composition where the foaming agent is excluded from the adhesive composition.

FIG. 6 is a graph overlaying the foaming ratio-time curve where time is on a horizontal axis and a foaming ratio of the foaming agent is on a vertical axis when a differential scanning calorimetry is carried out to the foaming agent, using a differential scanning calorimeter including a camera, on the DSC curve where time is on a horizontal axis and a heat flow is on a vertical axis, when a differential scanning calorimetry is carried out to the composition where the foaming agent is excluded from the adhesive composition. As shown in FIG. 6, in the foaming ratio-time curve 33 for the foaming agent, the time corresponding to the top of the peak is regarded as T1. Also, in a DSC curve 34 for the composition where the foaming agent is excluded from the adhesive composition, the time corresponding to the top of the exothermic peak is regarded as T2. The adhesive composition is heated so that T1<T2, when the conditions described above are satisfied in the adhering step.

In the present disclosure, since the adhesive composition is heated so that T1<T2 in the adhering step, the expansion of the foaming agent may be proceeded before the curing reaction of the thermosetting resin is proceeded so that the foaming agent may be expanded sufficiently. Therefore, the thickness of the adhesive layer during foaming may be increased so that the adhesive strength may be improved.

Meanwhile, when T1≥T2, the curing reaction of the thermosetting resin is proceeded before the shrinkage of the foaming agent is proceeded. Therefore, the expansion of the foaming agent is inhibited, the thickness of the adhesive layer during foaming is reduced, and the adhesive strength may be decreased.

In the present disclosure, as described above, since the adhesive composition satisfies A<B, and the adhesive composition is heated so that T1<T2 in the adhering step, the adhesive strength may be improved. Therefore, the reliability and durability of the product obtained by the method for producing a product in the present disclosure may be improved.

Each step of the method for producing a product and the adhesive composition in the present disclosure are hereinafter described.

1. Adhesive Composition

The adhesive composition in the present disclosure includes a thermosetting resin and a foaming agent. Also, the foaming agent is a thermally expandable microcapsule.

(1) Properties

In the adhesive composition in the present disclosure, A<B when the following conditions are satisfied: in a foaming ratio-time curve where time is on a horizontal axis and a foaming ratio of the foaming agent is on a vertical axis, when a differential scanning calorimetry is carried out to the foaming agent, using a differential scanning calorimeter including a camera, under heating conditions in the adhering step described below, a slope of a tangent line to the curve at a top of a peak, on a longer time side of the peak, is regarded as A; and in a DSC curve where time is on a horizontal axis and a heat flow is on a vertical axis, when a differential scanning calorimetry is carried out to the adhesive composition under the heating conditions in the adhering step described below, a slope of a tangent line to the curve at a top of an exothermic peak, on a longer time side of the exothermic peak, is regarded as B.

Here, the differential scanning calorimetry (DSC) to the foaming agent is carried out by the following method. Firstly, 0.16 mg to 0.17 mg of the foaming agent is weighed into a container. Then, using a differential scanning calorimeter including a camera, the temperature is raised and held under nitrogen gas flow rate of 20 ml/min and the heating conditions in the adhering step.

In relation to the differential scanning calorimeter including a camera, thermophysical properties may be measured with the differential scanning calorimeter, as well as the change in the form, color and so on of the sample during the differential scanning calorimetry may be observed. In the differential scanning calorimeter including a camera, DSC data and image data are synchronized with each other. Therefore, by carrying out the differential scanning calorimetry to the foaming agent using a differential scanning calorimeter including a camera, the foaming behavior of the foaming agent may be analyzed. Specifically, firstly, the area occupied by the foaming agent is determined from the image data. In this case, as shown in FIG. 3, for example, among all the image data, the area value occupied by the foaming agent when time is 0 is regarded as 0% foaming ratio of the foaming agent, and the value at which the area occupied by the foaming agent is the maximum is regarded as 100% foaming ratio of the foaming agent. The change in the foaming ratio of the foaming agent over time is indicated as a foaming ratio-time curve, for example, as shown in FIG. 3. As the differential scanning calorimeter including a camera, for example, "high-sensitivity differential scanning calorimeter DSC7000X" from Hitachi High-Tech Science Corporation may be used.

Incidentally, when carrying out a differential scanning calorimetry (DSC) to the foaming agent, the foaming agent may be separated by dissolving the adhesive composition in a solvent. The solvent is not particularly limited as long as the solvent is capable of dissolving the components other than the foaming agent included in the adhesive composition, and is appropriately selected according to the type, for example, of the thermosetting resin included in the adhesive composition. For example, a solvent used for the adhesive composition may be used. Specifically, for example, methyl ethyl ketone, ethyl acetate, and toluene may be used.

Also, in the foaming ratio-time curve for the foaming agent, the tangent line to the curve at the top of the peak, on the longer time side of the peak, is determined by the following method. The top of the peak is the point where the foaming ratio of the foaming agent is indicated as 100%. Also, in the curve on the longer time side of the peak, the point where the foaming ratio of the foaming agent is indicated as 70% is determined. As shown in FIG. 5 for example, a straight line connecting the top of the peak (the point indicating 100% foaming ratio of the foaming agent) and the point indicating 70% foaming ratio of the foaming agent in the curve, on the longer time side of the peak, is regarded the as tangent line L1 to the curve at the top of the peak, on a longer time side of the peak.

Incidentally, the peak in the foaming ratio-time curve is the part of the curve where the curve departs from the baseline until it returns to the baseline again.

Also, the differential scanning calorimetry (DSC) for the adhesive composition is carried out by the following method. Firstly, 5.00 mg to 5.03 mg of the adhesive composition is weighed into a container. Then, using a differential scanning calorimeter, the temperature is raised and held under nitrogen gas flow rate of 20 ml/min and the heating conditions in the adhering step.

Incidentally, when carrying out a differential scanning calorimetry (DSC) to the adhesive composition, when the adhesive composition includes a solvent, for example, the differential scanning calorimetry is carried out after the solvent is evaporated.

Also, in the DSC curve for the adhesive composition, the tangent line to the curve at the top of the exothermic peak, on the longer time side of the exothermic peak, is determined by the following method. Firstly, the heat flow at the top of the exothermic peak is determined. Also, when the heat flow at the top of the exothermic peak is regarded as 100%, the point where the heat flow is indicated as 70%, in the curve on the longer time side of the exothermic peak, is determined. Then, a straight line connecting the top of the exothermic peak and the point where the heat flow is indicated as 70%, in the curve on the longer time side of the exothermic peak, is regarded as the tangent line to the curve at the top of the exothermic peak, on a longer time side of the exothermic peak. In FIG. 5 for example, when the heat flow hf1 at the top of the exothermic peak is regarded as 100%, the heat flow hf2 is the point where the heat flow hf1 is indicated as 70%. A straight line connecting the top of the exothermic peak (the point indicating the heat flow hf1) and the point indicating the heat flow hf2 may be regarded as the tangent line L2 to the curve at the top of the exothermic peak, on a longer time side of the exothermic peak.

Incidentally, the baseline of the DSC curve for the adhesive composition is regarded as zero.

Also, the exothermic peak in the DSC curve is the part of the curve where the curve departs from the baseline until it returns to the baseline again.

Also, the foaming ratio-time curve for the foaming agent and the DSC curve for the adhesive composition are plotted in one graph by overlaying these by the following method. Firstly, since time is on the horizontal axis, the horizontal axis of the foaming ratio-time curve for the foaming agent and the horizontal axis of the DSC curve for the adhesive composition are the same. Also, for the vertical axis, the baseline position of the foaming ratio-time curve for the foaming agent and the baseline position of the DSC curve for the adhesive composition are shifted so that they coincide with each other. In doing so, the baseline of the foaming ratio-time curve for the foaming agent is regarded as zero. Also, as described above, the baseline of the DSC curve for the adhesive composition is regarded as zero. Further, for the vertical axis, the top position of the peak in the foaming ratio-time curve for the foaming agent (the point indicating 100% foaming ratio of the foaming agent) and the top position of the exothermic peak of the DSC curve for the adhesive composition are shifted so that they coincide with each other. Thereby, a graph as shown in FIG. 5 for example may be obtained.

Also, when the adhesive composition includes a plurality of foaming agents, at least one foaming agent may satisfy A<B. Among the above, among the plurality of foaming agents included in the adhesive composition, the foaming agent included in a large amount preferably satisfy A<B. In particular, all of the plurality of foaming agents included in the adhesive composition preferably satisfy A<B.

When the foaming ratio-time curve for the foaming agent includes a plurality of peaks, at least one peak may satisfy A<B. When the foaming ratio-time curve includes a plurality of peaks, the adhesive composition usually includes a plurality of foaming agents. Above all, all of these peaks preferably satisfy A<B.

Also, when the DSC curve for the adhesive composition includes a plurality of exothermic peaks due to the curing reaction of the thermosetting resin, at least one exothermic peak may satisfy A<B. When the DSC curve includes a plurality of exothermic peaks due to the curing reaction of the thermosetting resin, for example, the adhesive composition includes a plurality of thermosetting resins. Among the above, among the plurality of exothermic peaks due to the curing reaction of the thermosetting resin, an exothermic peak with small slope B preferably satisfy A<B. Particularly, all of these exothermic peaks preferably satisfy A<B.

The adhesive composition satisfies A<B. Above all, B is preferably much larger than A. When the slope B is large, the curing rate of the thermosetting resin is increased. Also, when the slope A is small, the shrinking rate of the foaming agent is decreased. Therefore, when B is much larger than A, the thermosetting resin may be sufficiently cured before the shrinkage of the foaming agent is proceeded so that the adhesion strength may be improved.

In the adhesive composition, the slope A may be controlled, for example, by adjusting the thickness of the shell of the thermally expandable microcapsule, which is a foaming agent. Specifically, when the thickness of the shell of the thermally expandable microcapsule is thick, the slope A tends to decrease. Meanwhile, the slope A tends to increase when the thickness of the shell of the thermally expandable microcapsule is thin.

Also, in the adhesive composition, the slope B may be controlled, for example, by adjusting the composition of the adhesive composition. For example, when the adhesive composition further includes a curing agent, the slope B tends to increase. Also, the slope B tends to increase more, for example, when the adhesive composition further includes a curing agent and a curing catalyst. Also, for example, when the adhesive composition includes a multi-functional thermosetting resin, the slope B tends to increase.

Also, in the foaming ratio-time curve for the foaming agent, the time from the peak top (the point indicating 100% foaming ratio of the foaming agent) until the stabilization of the shrinkage of the foaming agent is, for example, 0.5 minutes or more and 60 minutes or less, and may be 1 minute or more and 45 minutes or less. When the time is too short, the slope A may be large so that $A<B$ may not be satisfied. Also, when the time is too long, the foaming ratio of the foaming agent may decrease.

Also, in the DSC curve for the adhesive composition, the time from the exothermic peak top until it reaches the baseline is, for example, 0.1 minutes or more and 30 minutes or less, may be 0.2 minutes or more and 10 minutes or less, and may be 0.3 minutes or more and 5 minutes or less. When the time is too long, the slope B may be small so that $A<B$ may not be satisfied. Also, when the time is too short, the storage stability may decrease.

As described below, when the foaming adhesive sheet is used, and also when the foaming adhesive sheet includes a first adhesive layer and a second adhesive layer in the present disclosure, the adhesive composition included in at least one adhesive layer, among the first adhesive layer and the second adhesive layer, may include the foaming agent. When the adhesive composition included in only one adhesive layer, among the first adhesive layer and the second adhesive layer, includes the foaming agent, the adhesive composition including the foaming agent may satisfy the properties described above. Also, when both the adhesive composition included in the first adhesive layer and the adhesive composition included in the second adhesive layer include the foaming agent, the adhesive composition included in at least one adhesive layer may satisfy the properties described above. Among them, the adhesive composition included in both adhesive layers of the first adhesive layer and the second adhesive layer preferably satisfy the properties described above.

(2) Composition

The adhesive composition in the present disclosure includes a thermosetting resin and a foaming agent. Also, the foaming agent is a thermally expandable microcapsule.

(a) Foaming Agent

The foaming agent is a thermally expandable microcapsule. As the foaming agent, a thermally expandable microcapsule generally used for an adhesive composition may be used.

It is preferable that the thermally expandable microcapsule includes a thermal expansion agent such as a hydrocarbon as a core, and a resin such as an acrylonitrile copolymer as a shell.

One kind of the foaming agent may be used alone, and two kinds or more may be used in combination.

It is preferable that foaming start temperature of the foaming agent is softening temperature of the thermosetting resin or more, and also, activation temperature of the curing reaction of the thermosetting resin or less. Foaming start temperature of the foaming agent is, for example, 70° C. or more, and may be 100° C. or more. When the foaming start temperature is too low, the foaming may be started early, and foaming may occur in a condition where the flexibility and fluidity of the resin component are low, and uniform foaming may hardly occur. Meanwhile, the foaming start temperature of the foaming agent is, for example, 210° C. or less. When the foaming start temperature is too high, there is a possibility that the resin component is deteriorated.

Incidentally softening temperature of the thermosetting resin may be measured using the ring and ball type softening temperature testing method specified in JIS K7234.

The average particle size of the foaming agent may be, for example, 10 μm or more, may be 13 μm or more, and may be 17 μm or more. Also, the average particle size of the foaming agent is preferably the thickness of the adhesive layer or less, may be, for example 44 μm or less, may be 30 μm or less, and may be 24 μm or less.

Incidentally, the average particle size of the foaming agent is a particle size at integrated value of 50% in the particle size distribution determined by a laser diffraction/scattering method. Also, when measuring the average particle size of the foaming agent, the foaming agent is separated by dissolving the adhesive composition in a solvent. The solvent is not particularly limited as long as the solvent is capable of dissolving the components other than the foaming agent included in the adhesive composition, and is appropriately selected according to the type, for example, of the thermosetting resin included in the adhesive composition. For example, a solvent used for an adhesive composition may be used. Specifically, for example, methyl ethyl ketone, ethyl acetate, and toluene may be used.

Foaming magnification of the foaming agent at the maximum foaming temperature is, for example, 1.5 times or more, and may be 3 times or more. Meanwhile, foaming magnification of the foaming agent at the maximum foaming temperature is, for example, 15 times or less, and may be 10 times or less.

The content of the foaming agent when the resin component included in the adhesive composition is regarded as 100 mass parts is, for example, 0.5 mass parts or more, may be 2 mass parts or more, may be 3 mass parts or more, may be 4 mass parts or more, and may be 5 mass parts or more. Meanwhile, the content of the foaming agent with respect to 100 mass parts of the resin component included in the adhesive composition is, for example, 25 mass parts or less, may be 20 mass parts or less, and may be 15 mass parts or less.

(b) Thermosetting Resin

As the thermosetting resin, a thermosetting resin generally used for an adhesive composition may be used. The thermosetting resin may be applied even when the first member or the second member is not transparent, such as a metal member.

Examples of the thermosetting resin may include epoxy resins, acrylic resins, phenolic resins, unsaturated polyester resins, alkyd resins, urethane resins and thermosetting polyimide resins.

Among them, epoxy resins are preferable. In this case, adhesive composition preferably includes epoxy resin as thermosetting resin, a curing agent and a foaming agent. The adhesive composition including epoxy resin is usually excellent in mechanical strength, heat resistance, insulating property and chemical resistance, and low in curing shrinkage, so that it may be used in a wide variety of applications.

The epoxy resin is hereinafter explained referring to examples.

(Epoxy Resin)

The epoxy resin in the present disclosure is a compound including at least one or more epoxy group or glycidyl group, and cured by causing a cross-linking polymerization reaction by being used in combination with a curing agent. The epoxy resin also includes a monomer including at least one or more epoxy group or glycidyl group.

Examples of the epoxy resin may include an aromatic epoxy resin, an aliphatic epoxy resin, an alicyclic epoxy resin, and a heterocyclic epoxy resin. Specific examples of the epoxy resin may include bisphenol type epoxy resins such as a bisphenol A type epoxy resin and a bisphenol F type epoxy resin; novolac type epoxy resins such as a bisphenol A novolac type epoxy resin and a cresol novolac type epoxy resin; and modified epoxy resins such as a urethane modified epoxy resin and a rubber modified epoxy resin. Further, other specific example may include a biphenyl type epoxy resin, a stilbene type epoxy resin, a triphenol methane type epoxy resin, an alkyl-modified triphenol methane type epoxy resin, a triazine nucleus-containing epoxy resin, a dicyclopentadiene-modified phenol type epoxy resin, a naphthalene type epoxy resin, a glycol type epoxy resin, and a pentaerythritol type epoxy resin. The epoxy resin may be one kind, and may be two kinds or more.

The bisphenol A type epoxy resin may be present in a liquid state at ordinary temperature or in a solid state at ordinary temperature according to the number of repeating units of the bisphenol skeleton. The bisphenol A type epoxy resin wherein the bisphenol skeleton of the main chain is, for example, 2 or more and 10 or less is solid at ordinary temperature. In particular, the bisphenol A type epoxy resin is preferable in that heat resistance may be improved.

The epoxy resin may be a monofunctional epoxy resin, may be a bifunctional epoxy resin, may be a trifunctional epoxy resin, and may be an epoxy resin of a tetrafunctional or more.

(c) Acrylic Resin

In the present disclosure, when the adhesive composition includes epoxy resins as the thermosetting resin, it may further include acrylic resin compatible with the epoxy resin. The acrylic resin is a resin compatibilized with the epoxy resin. Since the acrylic resin is compatible with the epoxy resin, the toughness of the adhesive layer is likely to be improved. As the result, the adhesiveness after foamed and cured may be improved. Further, the acrylic resin is believed to function as a compatibilizing agent of the foaming agent (such as a foaming agent whose shell part is an acrylonitrile copolymer resin), and the adhesiveness after foamed and cured is improved by being uniformly dispersed and foamed. Also, the flexibility due to the acrylic resin is exhibited so that the close adhesiveness with respect to the substrate after foamed and cured, and cracking resistance after foamed and cured may be improved. Also, the hardness of the adhesive layer surface may be maintained at high level, by the acrylic resin being compatibilized with the epoxy resin. Meanwhile, if the acrylic resin is incompatible with the epoxy resin, a flexible part is formed on the adhesive layer surface so that the interface with the first member or the second member is not slippery enough, and the workability may be deteriorated.

The acrylic resin in the present disclosure is compatibilized with the epoxy resin. Here, the state that the acrylic resin being compatibilized with the epoxy resin may be confirmed by, for example, producing an adhesive layer using the adhesive composition, and observing the cross-section of the adhesive layer with a scanning electron microscope (SEM) or a transmission electron microscope (TEM), to confirm that a micron sized island is not formed. More specifically, the average particle size of the island is preferably 1 μm or less. Among the above, the average particle size of the island may be 0.5 μm or less, and may be 0.3 μm or less. The number of the samples is preferably large, and is, for example, 100 or more. The area of the observed region is in a range of 100 μm×100 μm, or when the thickness of the adhesive layer is 100 μm or less, the observation is carried out in a range of thickness×100 μm.

The acrylic resin may include a polar group. Examples of the polar group may include an epoxy group, a hydroxyl group, a carboxyl group, a nitrile group, and an amide group.

The acrylic resin may be a homopolymer of acrylic acid ester monomers that is a mixture component including two kinds or more of the above described homopolymer; and may be a copolymer of two kinds or more acrylic acid ester monomers that is a component including one or more copolymer. Also, the acrylic resin may be a mixture component of the homopolymer and the copolymer. The "acrylic acid" in the acrylic acid ester monomers includes the concept of a methacrylic acid. Specifically, the acrylic resin may be a mixture of the methacrylate polymer and the acrylate polymer, and may be an acrylic acid ester polymer such as acrylate-acrylate, methacrylate-methacrylate, and methacrylate-acrylate. Among them, the acrylic resin preferably includes a copolymer of two kinds or more acrylic acid ester monomers ((meth)acrylic acid ester copolymer).

Examples of the monomer component constituting the (meth)acrylic acid ester copolymer may include the monomer component described in Japanese Patent Application Laid-Open (JP-A) No. 2014-065889. The monomer component may include the above described polar group. Examples of the (meth)acrylic acid ester copolymer may include an ethyl acrylate-butyl acrylate-acrylonitrile copolymer, an ethyl acrylate-acrylonitrile copolymer, and a butyl acrylate-acrylonitrile copolymer. Incidentally, the "acrylic acid" such as acrylic acid methyl and acrylic acid ethyl include "methacrylic acid" such as methacrylic acid methyl and methacrylic acid ethyl.

As the (meth) acrylic acid ester copolymer, a block copolymer is preferable, and an acrylic block copolymer such as a methacrylate-acrylate copolymer is further preferable. Examples of the (meth) acrylate constituting the acrylic block copolymer may include methyl acrylate, ethyl acrylate, propyl acrylate, butyl acrylate, lauryl acrylate, 2-ethylhexyl acrylate, cyclohexyl acrylate, and benzyl acrylate. These "acrylic acid" also includes "methacrylic acid".

Specific examples of the methacrylate-acrylate copolymer may include acrylic copolymers such as methyl methacrylate-butyl acrylate-methyl methacrylate (MMA-BA-MMA) copolymers. MMA-BA-MMA copolymers also include block copolymers of polymethylmethacrylate-polybutylacrylate-polymethylmethacrylate (PMMA-PBA-PMMA).

The acrylic copolymer may not include a polar group, and may be a modified product wherein the above described polar group is introduced into a part. Since the modified product is easily compatible with an epoxy resin, adhesiveness is further improved.

Among them, the acrylic resin is preferably a (meth) acrylic acid ester copolymer including a first polymer portion having glass transition temperature (Tg) of 10° C. or less, and a second polymer portion having glass transition temperature (Tg) of 20° C. or more. Such a (meth) acrylic acid ester copolymer includes a first polymer portion to be a soft segment and a second polymer portion to be a hard segment. By adding such a copolymer, the adhesive layer may improve the toughness after curing and increase the adhesive strength.

The expression of the above effect may be estimated as follows. By using an acrylic resin including both of a soft segment and a hard segment, such as the above (meth) acrylic acid ester copolymer, the hard segment contributes to heat resistance, and the soft segment contributes to toughness or flexibility, so that an adhesive layer having good heat resistance, toughness, and flexibility may be obtained.

At least one of the first polymer portion and the second polymer portion included in the above (meth) acrylic acid ester copolymer has compatibility with the epoxy resin. When the first polymer portion has compatibility with the epoxy resin, flexibility may be increased. Also, when the second polymer portion has compatibility with the epoxy resin, it is possible to enhance the cohesiveness and toughness.

Among the above, the (meth) acrylic acid ester copolymer is preferably a block copolymer, and particularly preferably an A-B-A block copolymer including a polymer block A as a compatible site and a polymer block B as a non-compatible site. Further, it is preferable to be an A-B-A block copolymer wherein the first polymer portion is a non-compatible site and the second polymer portion is a compatible site, and the first polymer portion is a polymer block B and the second polymer portion is a polymer block A.

Further, the above (meth) acrylic acid ester copolymer may be a modified product obtained by introducing the above mentioned polar group into a part of the first polymer portion or the second polymer portion.

Specific examples of the (meth) acrylic acid ester copolymer including the first polymer portion and the second polymer portion described above may include the above described MMA-BA-MMA copolymers.

The content of the acrylic resin when the resin component included in the adhesive composition is regarded as 100 mass parts is, for example, 1 mass part or more, may be 3 mass parts or more, may be 5 mass parts or more, may be 7 mass parts or more, and may be 10 mass parts or more. When the content of the acrylic resin is too low, the adhesiveness after foamed and cured and the adhesiveness of the adhesive layer with respect to the substrate may be deteriorated. Meanwhile, the content of the acrylic resin when the resin component included in the adhesive composition is regarded as 100 mass parts is, for example, 60 mass parts or less, may be 50 mass parts or less, may be 40 mass parts or less, may be 35 mass parts or less, and may be 30 mass parts or less. When the content of the acrylic resin is too high, the strength of the film may be decreased.

(d) Curing Agent

The adhesive composition in the present disclosure may further include a curing agent.

When the adhesive composition includes epoxy resin as the thermosetting resin, a curing agent generally used in an epoxy resin based adhesive may be used as a curing agent.

The curing agent is preferably solid at 23° C. The curing agent that is solid at 23° C. may improve storage stability (pot life), compared to the curing agent that is liquid at 23° C. Also, the curing agent may be a latent curing agent. Also, the curing agent is usually a curing agent wherein a curing reaction occurs by heat. Also, one kind of the curing agent may be used alone, and two kinds or more may be used.

Reaction start temperature of the curing agent is, for example, 110° C. or more, and may be 130° C. or more. When the reaction start temperature is too low, the reaction may be started early, and curing may occur in a condition where the flexibility and fluidity of the resin component are low, and uniform curing may hardly occur. Meanwhile, the reaction start temperature of the curing agent is, for example, 200° C. or less. When the reaction start temperature is too high, there is a possibility that the resin component is deteriorated. Incidentally, in addition to the epoxy resin, for example, when a resin having high heat resistance such as a phenol resin is used, since deterioration of the resin component is small, reaction start temperature of the curing agent may be, for example, 300° C. or less. The reaction start temperature of the curing agent may be determined by differential scanning calorimetry (DSC).

Specific examples of the curing agent may include an imidazole based curing agent, a phenol based curing agent, an amine based curing agent, an acid anhydride based curing agent, an isocyanate based curing agent, and a thiol based curing agent.

Examples of the imidazole based curing agent may include imidazoles, 2-phenyl-4,5-dihydroxymethylimidazole, 2-phenyl-4-methyl-5-hydroxymethylimidazole, 2-methylimidazole, 2-ethylimidazole, 2-ethyl-4-methylimidazole, 2-isopropylimidazole, 2-phenylimidazole, carboxylates of imidazole compounds, and adducts with epoxy compounds. Also, it is preferable that the imidazole based curing agent includes a hydroxyl group. Since it crystallizes by hydrogen bonding between hydroxy groups, reaction start temperature tends to be high.

Examples of the phenol based curing agent may include phenol resins. Further, examples of the phenol resin may include a resol type phenol resin and a novolac type phenol resin. From the viewpoint of the close adhesiveness with respect to the substrate after foamed and cured, and cracking resistance after foamed and cured, for example, a phenol type novolac resin having a Tg of 110° C. or less is particularly preferable. Also, a phenol based curing agent and an imidazole based curing agent may be used in combination. In this case, it is preferable to use an imidazole based curing agent as a curing catalyst.

Examples of the amine based curing agent may include aliphatic amines such as diethylenetriamine (DETA), triethylenetetramine (TETA), and meta-xylylenediamine (MXDA); aromatic amines such as diaminodiphenylmethane (DDM), m-phenylenediamine (MPDA), and diaminodiphenylsulfone (DDS); alicyclic amines; and polyamidoamines. Also, as an amine based curing agent, a dicyandiamide based curing agent such as dicyandiamide (DICY); an organic acid dihydrazide based curing agent; an amine adduct based curing agent; and a ketimine based curing agent may be used.

Examples of the acid anhydride based curing agent may include alicyclic acid anhydrides (liquid acid anhydrides) such as hexahydrophthalic anhydride (HHPA) and methyltetrahydrophthalic anhydride (MTHPA); and aromatic acid anhydrides such as trimellitic anhydride (TMA), pyromellitic anhydride (PMDA), and benzophenone tetracarboxylic dianhydride (BTDA).

Examples of the isocyanate based curing agent may include blocked isocyanate.

Examples of the thiol based curing agent may include an ester binding type thiol compound, an aliphatic ether binding type thiol compound, and an aromatic ether binding type thiol compound.

Among them, it is preferable to use a curing agent other than an imidazole based curing agent together with an imidazole based curing agent. In this case, it is preferable to use an imidazole based curing agent as a curing catalyst.

The content of the curing agent when the resin component included in the adhesive composition is regarded as 100 mass parts is, for example, 1 mass part or more and 40 mass parts or less. For example, when an imidazole based curing agent is used as a main component as the curing agent, the content of the curing agent when the resin component included in the adhesive composition is regarded as 100 mass parts is preferably, for example, 1 mass part or more and 15 mass parts or less. Meanwhile, when a phenol based curing agent is used as a main component as a curing agent, the content of the curing agent when the resin component included in the adhesive composition is regarded as 100 mass parts is preferably, for example, 5 mass parts or more and 40 mass parts or less. Incidentally, the use of an imidazole based curing agent or a phenol based curing agent as a main component as the curing agent means that the mass proportion of the imidazole based curing agent or the phenol based curing agent is the highest in the curing agent.

(e) Other Components

For example, when the thermosetting resin is epoxy resin, the adhesive composition in the present disclosure may include only the epoxy resin and the acrylic resin as the resin component, and may further include other resins. Examples of the other resin may include urethane resins.

The proportion of the total of the epoxy resin and the acrylic resin with respect to the resin components included in the adhesive composition is, for example, 70 mass % or more, may be 80 mass % or more, may be 90 mass % or more, and may be 100 mass %.

The content of the resin components included in the adhesive composition is, for example, 60 mass % or more, may be 70 mass % or more, may be 80 mass % or more, and may be 90 mass % or more.

The adhesive composition may include an additive such as silane coupling agents, fillers, antioxidants, light stabilizers, ultraviolet ray absorbers, lubricants, plasticizers, antistatic agents, cross-linking agents, and colorants, if necessary. Examples of the silane coupling agent may include an epoxy based silane coupling agent. Examples of the filler may include inorganic fillers such as calcium carbonate, aluminum hydroxide, magnesium hydroxide, antimony trioxide, zinc borate, molybdenum compounds, and titanium dioxide. Examples of the antioxidant may include a phenol based antioxidant and a sulfur based antioxidant.

The adhesive composition may include a solvent and may not include a solvent. Incidentally, the solvent in the present descriptions is in a broad sense including not only a strict solvent (a solvent for dissolving a solute) but also a dispersion medium. Also, the solvent included in the adhesive composition is volatilized and removed when the adhesive composition is applied and dried to form an adhesive layer.

(3) Method for Preparation

The adhesive composition may be obtained by mixing each of the above described components and kneading and dispersing them, if necessary. Examples of the mixing and dispersing methods may include common kneading dispersers such as twin roll mills, triple roll mills, pebble mills, tron mills, Szegvari attritors, high-speed impeller dispersers, high-speed stone mills, high-speed impact mills, Despar, high-speed mixers, ribbon blenders, cokneaders, intensive mixers, tumblers, blenders, dispersers, homogenizers, and ultrasonic dispersers.

2. Placing Step

Thea placing step in the present disclosure is a step of placing the adhesive composition between a first member and a second member When placing the adhesive composition between the first member and the second member, for example, a foaming adhesive sheet including an adhesive layer including the adhesive composition may be used, and the foaming adhesive sheet may be placed between the first member and the second member. Also, a liquid adhesive composition may be used, for example, and the liquid adhesive composition may be applied on at least one surface of the first member and the second member. Among them, it is preferable to use a foaming adhesive sheet, and to place the foaming adhesive sheet between the first member and the second member. The foaming adhesive sheet has excellent handling property and workability.

When the foaming adhesive sheet is used, the foaming adhesive sheet may include, for example, only an adhesive layer including the adhesive composition; may include a first adhesive layer including the adhesive composition and a second adhesive layer including the adhesive composition; and may include a first adhesive layer including the adhesive composition, a substrate and a second adhesive layer including the adhesive composition, in this order.

Incidentally, the foaming adhesive sheet will be described later.

Also, when the foaming adhesive sheet is used, a method for placing the foaming adhesive sheet between the first member and the second member is appropriately selected according to the type of the first member and the second member. Examples of the method may include a method wherein the foaming adhesive sheet is placed on one member of the first member and the second member, and the other member is placed on the foaming adhesive sheet, on the opposite surface side to the one member; a method wherein the foaming adhesive sheet is inserted into a gap between the first member and the second member; a method wherein, after placing the foaming adhesive sheet in a hole, groove and so on of the first member, the second member is inserted into a gap after placing the foaming adhesive sheet in a hole, groove and so on of the first member. Also, when the first member includes a hole or a groove, and the second member is adhered by placing thereof in the hole or groove of the first member, examples of the method may include a method wherein the foaming adhesive sheet is adhered to the second member, and then the second member to which the foaming adhesive sheet is adhered is placed in the hole or groove of the first member; and a method wherein the foaming adhesive sheet is adhered to the hole or groove of the first member, and then, in the hole or groove of the first member to which the foaming adhesive sheet is adhered, the second member is placed.

Also, when a liquid adhesive composition is used, a method for placing the liquid adhesive composition between the first member and the second member is appropriately selected according to the type of the first member and the second member. Examples of the method may include a method wherein the liquid adhesive composition is applied on one member of the first member and the second member, and the other member is placed on the coating film of the liquid adhesive composition; a method wherein the liquid adhesive composition is injected into a gap between the first member and the second member; a method wherein, after applying the liquid adhesive composition in a hole, groove and so on of the first member, the second member is inserted into a gap after applying the liquid adhesive composition in a hole, groove and so on of the first member. Also, for example, when the first member includes a hole or a groove, and the second member is adhered by placing thereof in the hole or groove of the first member, examples of the method may include a method wherein the liquid adhesive composition is applied to the second member, and then, the second member to which the liquid adhesive composition is applied is placed in the hole or groove of the first member; and a method wherein the liquid adhesive composition is applied to in the hole or groove of the first member, and then, in the hole or groove of the first member to which the liquid adhesive composition is applied, the second member is placed.

The method for applying the liquid adhesive composition is not particularly limited, and examples of the method for application may include roll coating, reverse roll coating, transfer roll coating, gravure coating, gravure reverse coating, comma coating, rod coating, blade coating, bar coating, wire bar coating, die coating, lip coating, and dip coating.

3. Adhering Step

The adhering step in the present disclosure is a step of adhering the first member and the second member by foaming and curing the adhesive composition by heating.

In the present disclosure, the adhesive composition is heated so that T1<T2 when following conditions are satisfied in the adhering step: in a foaming ratio-time curve where time is on a horizontal axis and a foaming ratio of the foaming agent is on a vertical axis, when a differential scanning calorimetry is carried out to the foaming agent, using a differential scanning calorimeter including a camera, time corresponding to a top of a peak is regarded as T1, and in a DSC curve where time is on a horizontal axis and a heat flow is on a vertical axis, when a differential scanning calorimetry is carried out to a composition where the foaming agent is excluded from the adhesive composition, time corresponding to a top of an exothermic peak is regarded as T2.

Here, the differential scanning calorimetry (DSC) to the foaming agent is carried out by the following method. Firstly, 0.16 mg to 0.17 mg of the foaming agent is weighed into a container. Then, using a differential scanning calorimeter including a camera, the temperature is raised and held under nitrogen gas flow rate of 20 ml/min and predetermined temperature rising rate, heating temperature, holding time and temperature rising rate.

Also, the differential scanning calorimetry (DSC) to a composition where the foaming agent is excluded from the adhesive composition is carried out by the following method. Firstly, 5.00 mg to 5.03 mg of the composition where the foaming agent is excluded from the adhesive composition is weighed into a container. Then, using a differential scanning calorimeter, the temperature is raised and held under nitrogen gas flow rate of 20 ml/min and predetermined temperature rising rate, heating temperature, holding time and temperature rising rate. In doing so, the heating conditions in the differential scanning calorimetry (DSC) to the foaming agent and in the differential scanning calorimetry (DSC) to the composition where the foaming agent is excluded from the adhesive composition, are the same.

Also, the foaming ratio-time curve for the foaming agent and the DSC curve for the composition where the foaming agent is excluded from the adhesive composition, are plotted in one graph by overlaying these by the following method. Since time is on the horizontal axis, the horizontal axis of the foaming ratio-time curve for the foaming agent and the horizontal axis of the DSC curve for the composition where the foaming agent is excluded from the adhesive composition, are the same. Thereby, a graph as shown in FIG. 6 for example may be obtained.

Also, when the adhesive composition includes a plurality of foaming agents, at least one foaming agent may satisfy T1<T2. Among the above, among the plurality of foaming agents included in the adhesive composition, the foaming agent included in a large amount preferably satisfy T1<T2. In particular, all of the plurality of foaming agents included in the adhesive composition preferably satisfy T1<T2.

When the foaming ratio-time curve for the foaming agent includes a plurality of peaks, at least one peak may satisfy T1<T2. When the foaming ratio-time curve includes a plurality of peaks, the adhesive composition usually includes a plurality of foaming agents. Above all, all of these peaks preferably satisfy T1<T2.

Also, when the adhesive composition includes a plurality of thermosetting resins, all of the plurality of thermosetting resins included in the adhesive composition preferably satisfy T1<T2.

When the DSC curve for the composition where the foaming agent is excluded from the adhesive composition, includes a plurality of exothermic peaks due to the curing reaction of the thermosetting resin, all of the exothermic peaks preferably satisfy T1<T2.

The adhesive composition is heated so that T1<T2 in the adhering step.

In the adhering step, for example, by adjusting the temperature rising time from room temperature to the heating temperature, the time T1 at the top of the peak in the foaming ratio-time curve for the foaming agent and the time T2 at the top of the exothermic peak in the DSC curve for the composition where the foaming agent is excluded from the adhesive composition, may be controlled. Specifically, when the temperature rising time from room temperature to the heating temperature is short, T1 tends to be on the shorter time side than T2. Meanwhile, when the temperature rising time from room temperature to the heating temperature is long, T1 tends to be on the longer time side than T2.

Also, the heating temperature in the adhering step is preferably, for example, in a range of ±40° C. of the maximum foaming temperature of the foaming agent, more preferably in a range of ±30° C. of the maximum foaming temperature of the foaming agent, and further preferably in a range of ±20° C. of the maximum foaming temperature of the foaming agent. When the heating temperature is higher than the range, the thickness of the adhesive layer during foaming cannot be maintained due to the shrinkage of the foaming agent, even when the thermosetting resin is cured, so that the adhesive strength may be deteriorated. Meanwhile, when the heating temperature is lower than the range, the expansion of the foaming agent may not be sufficient so that the adhesion strength may be reduced. In this case, the interfacial fracture between the adhesive composition after foamed and cured and the first member or second member may easily occur.

Incidentally, in a foaming ratio-time curve where time is on a horizontal axis and a foaming ratio of the foaming agent is on a vertical axis, when a differential scanning calorimetry is carried out to the foaming agent, using a differential scanning calorimeter including a camera, the maximum foaming temperature of the foaming agent is the temperature at the top of the peak. In this case, the heating condition in the differential scanning calorimetry may be, for example, a temperature rising rate of 31° C./min.

Also, in the adhering step, the temperature rising time from room temperature to the heating temperature is, for example, 0.1 minutes or more and 60 minutes or less, may be 0.3 minutes or more and 45 minutes or less, and may be 0.5 minutes or more and 30 minutes or less. When the temperature rising time is too short, the temperature rising rate is high so that an overshoot may occur, and may result in a large deviation from the target temperature. Meanwhile, when the temperature rising time is too long, $T1<T2$ may not be satisfied.

Also, in the adhering step, the holding time at the heating temperature is, for example, 0.5 minutes or more and 240 minutes or less, may be 1 minute or more and 120 minutes or less, and may be 2 minutes or more and 60 minutes or less. When the heating temperature is high, and also when the holding time is long, the thickness of the adhesive layer during foaming cannot be maintained due to the shrinkage of the foaming agent, even when the thermosetting resin is cured, so that the adhesive strength may be deteriorated.

4. Foaming Adhesive Sheet

The foaming adhesive sheet in the present disclosure includes at least an adhesive layer including the adhesive composition.

Also, the foaming adhesive sheet may include only an adhesive layer; may include a first adhesive layer and a second adhesive layer; and may include a first adhesive layer, a substrate and a second adhesive layer, in this order. When the substrate is placed between the first adhesive layer and the second adhesive layer, the handling property and workability of the foaming adhesive sheet may be improved. Meanwhile, when the foaming adhesive sheet does not include a substrate, the total thickness of the foaming adhesive sheet may be reduced. Therefore, for example, it is possible to insert the foaming adhesive sheet even in a narrow gap.

Figure 7:
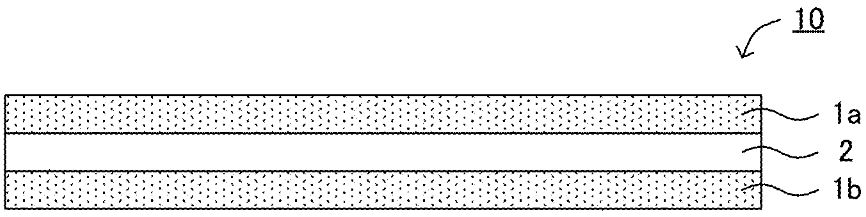
FIG. 7 is a schematic cross-sectional view illustrating an example of a foaming adhesive sheet in the present disclosure.

For example, the foaming adhesive sheet 10 shown in FIG. 2 includes only the adhesive layer 1. Also, for example, the foaming adhesive sheet 10 shown in FIG. 7 includes the first adhesive layer 1*a*, the substrate 2, and the second adhesive layer 1*b*, in this order.

(1) Adhesive Layer

The adhesive layer includes the adhesive composition.

The thickness of the adhesive layer is not particularly limited, and it is preferably average particle size of the foaming agent or more, for example, 10 μm or more, may be 15 μm or more, and may be 20 μm or more. When the adhesive layer is too thin, the close adhesiveness with respect to the substrate and the adhesiveness after foamed and cured may not be sufficiently obtained. Meanwhile, the thickness of the adhesive layer is, for example, 200 μm or less, may be 150 μm or less, and may be 100 μm or less. When the adhesive layer is too thick, the quality of the surface may be deteriorated.

Here, the thickness of the adhesive layer is a value measured from a cross-section in the thickness direction of the foaming adhesive sheet observed with a transmission electron microscope (TEM), a scanning electron microscope (SEM), or a scanning transmission type electron microscope (STEM), and may be an average value of the thickness at 10 locations selected at random. Incidentally, this is similar to a method for measuring the thickness of other layer included in the foaming adhesive sheet.

The adhesive layer may be a continuous layer, and may be a discontinuous layer. Example of the discontinuous layer may include patterns such as stripes and dots. Also, the surface of the adhesive layer may have a concavo-convex shape such as emboss.

The adhesive layer may be formed, for example, by applying the adhesive composition and removing solvent. Examples of application method may include roll coating, reverse roll coating, transfer roll coating, gravure coating, gravure reverse coating, comma coating, rod coating, blade coating, bar coating, wire bar coating, die coating, lip coating, and dip coating.

(2) Substrate

The substrate preferably has an insulating property. Also, it is preferable that the substrate is in a sheet form. The substrate may have a single layer structure, and may have a multiple layer structure. Also, the substrate may or may not have a porous structure inside.

Examples of the substrate may include a resin substrate and a nonwoven fabric.

Examples of the resin included in the resin substrate may include polyester resins such as polyethylene terephthalate (PET), polybutylene terephthalate, polyethylene naphthalate (PEN), and aromatic polyesters; polycarbonates; polyarylates; polyurethanes; polyamide resins such as polyamides, and polyetheramides; polyimide resins such as polyimides, polyetherimides, and polyamideimides; polysulfone resins such as polysulfones, and polyethersulfones; polyetherketone resins such as polyetherketones, and polyether ether ketones; polyphenylene sulfides (PPS); and modified polyphenylene oxides. The glass transition temperature of the resin is, for example, 80° C. or more, may be 140° C. or more, and may be 200° C. or more. Also, a liquid crystal polymer (LCP) may be used as the resin.

Examples of the nonwoven fabric may include nonwoven fabrics including fibers such as cellulose fibers, polyester fibers, nylon fibers, aramid fibers, polyphenylene sulfide fibers, liquid crystal polymer fibers, glass fibers, metal fibers, and carbon fibers.

In order to improve the close adhesiveness with respect to the adhesive layer, the surface of the substrate may be subjected to a surface treatment.

The average thickness of the substrate is not particularly limited, and is, for example, 2 μm or more, may be 5 μm or more, and may be 9 μm or more. Also, the average thickness of the substrate is, for example, 200 μm or less, may be 100 μm or less, and may be 50 μm or less.

(3) Other Constitutions

The foaming adhesive sheet in the present disclosure may include another configuration in addition to the adhesive layer and substrate described above, if necessary.

(a) Intermediate Layer

The foaming adhesive sheet in the present disclosure may include an intermediate layer between the substrate and the adhesive layer. By placing the intermediate layer, the close adhesiveness of the adhesive layer with respect to the substrate may be improved. Further, by placing the intermediate layer, for example, the stress applied to a bent portion when the foaming adhesive sheet is bent may be eased, or the stress applied to a cut portion when the foaming adhesive sheet is cut may be eased. As the result, lifting off or peeling off of the adhesive layer from the substrate may be suppressed when the foaming adhesive sheet is bent or cut.

Figure 8:
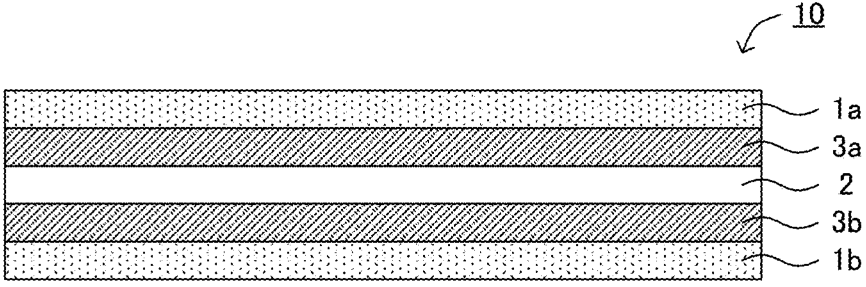
FIG. 8 is a schematic cross-sectional view illustrating an example of a foaming adhesive sheet in the present disclosure.

For example, in the foaming adhesive sheet 10 shown in FIG. 8, first intermediate layer 3*a* is placed between the substrate 2 and the first adhesive layer 1*a*, and second intermediate layer 3*b* is placed between the substrate 2 and the second adhesive layer 1*b*. Incidentally, in FIG. 8, although the foaming adhesive sheet 10 includes both first intermediate layer 3*a* and the second intermediate layer 3*b*, only either one may be included.

The material included in the intermediate layer is not particularly limited as long as the material is capable of improving the close adhesiveness between the substrate and the adhesive layer, and also capable of releasing the stress, and the material is appropriately selected according to the material and so on of the substrate and the adhesive layer. Examples thereof may include polyester, polyvinyl chloride, polyvinyl acetate, polyurethane, a polymer obtained by copolymerizing at least 2 kinds or more of them, cross-linked material thereof, and mixture thereof.

The cross-linked material is a cross-linked material wherein the resin described above is cross-linked by a curing agent. Examples of the curing agent may include an isocyanate based curing agent. Also, for example, when reactive group/NCO equivalent is regarded as 1, the isocyanate based curing agent is preferably added at proportion of 0.5 mass % or more and 20 mass % or less, with respect to the resin.

Among the above, the intermediate layer preferably includes a cross-linked resin. Incidentally, the cross-linked resin means those not fused at high temperature. Thereby, the adhesive force under high temperature, that is, the heat resistance may be improved.

The thickness of the intermediate layer is not particularly limited, and is, for example, 0.1 μm or more, may be 0.5 μm or more, and may be 1 μm or more. When the intermediate layer is too thin, there is a possibility that sufficient effect of suppressing the peeling off of the adhesive layer from the substrate when the foaming adhesive sheet is bent or cut, may not be obtained. Meanwhile, the thickness of the intermediate layer is, for example, 4 μm or less, and may be 3.5 μm or less. Since the heat resistance of the intermediate layer itself is usually not high, when the intermediate layer is too thick, the heat resistance (adhesive strength under high temperature) may be reduced.

The intermediate layer may be formed, for example, by applying a resin composition and removing solvent. Examples of application methods may include roll coating, reverse roll coating, transfer roll coating, gravure coating, gravure reverse coating, comma coating, rod coating, blade coating, bar coating, wire bar coating, die coating, lip coating, and dip coating.

(4) Foaming Adhesive Sheet

The thickness of the foaming adhesive sheet in the present disclosure is, for example, 10 μm or more, and may be 20 μm or more. Meanwhile, the thickness of the foaming adhesive sheet is, for example, 1000 μm or less, and may be 200 μm or less.

(5) Method for Producing Foaming Adhesive Sheet

The method for producing a foaming adhesive sheet in the present disclosure is not particularly limited. When the foaming adhesive sheet does not include a substrate, examples thereof may include a method wherein, after forming an adhesive layer by applying the adhesive composition described above on one surface of a separator and drying, the separator is peeled off from the adhesive layer.

Also, for example, when the foaming adhesive sheet includes a first adhesive layer, a substrate and second adhesive layer in this order, examples of the method may include a method wherein, the first adhesive layer and the second adhesive layer are formed by applying the adhesive composition described above on both surface of the substrate respectively, and drying. The first adhesive layer and the second adhesive layer may be formed sequentially, and may be formed simultaneously. Also, examples of the method may include a method wherein the first adhesive layer is formed by applying the adhesive composition on one surface of the substrate and drying, or the second adhesive layer is formed by applying the adhesive composition on one surface of a separator and drying, and the second adhesive layer and the separator are laminated on the other surface of the substrate.

5. First Member and Second Member

The first member and the second member in the present disclosure is selected as appropriate according to the use application and so on of the product. The first member and the second member are preferably those required to be adhered and insulated. Examples thereof may include a component of an electrical/electronic device.

B. Adhesive Composition

The adhesive composition in the present disclosure comprises a thermosetting resin and a foaming agent, wherein the foaming agent is a thermally expandable microcapsule; $C<D$ when following conditions are satisfied, in a foaming ratio-time curve where time is on a horizontal axis and a foaming ratio of the foaming agent is on a vertical axis, when a differential scanning calorimetry is carried out to the foaming agent, using a differential scanning calorimeter including a camera, under heating conditions of rising temperature from room temperature to a maximum foaming temperature of the foaming agent in 5 minutes, and holding at the maximum foaming temperature of the foaming agent, a slope of a tangent line to the curve at a top of a peak, on a longer time side of the peak, is regarded as C, and in a DSC curve where time is on a horizontal axis and a heat flow is on a vertical axis, when a differential scanning calorimetry is carried out to the adhesive composition under the heating conditions described above, a slope of a tangent line to the curve at a top of an exothermic peak, on a longer time side of the exothermic peak, is regarded as D.

Here, the differential scanning calorimetry (DSC) to the foaming agent is carried out by the following method. Firstly, 0.16 mg to 0.17 mg of the foaming agent is weighed into a container. Then, using a differential scanning calorimeter including a camera, the temperature is raised and held under nitrogen gas flow rate of 20 ml/min and under heating conditions of rising temperature from room temperature to the maximum foaming temperature of the foaming agent in 5 minutes, and holding at the maximum foaming temperature of the foaming agent.

Incidentally, in the foaming ratio-time curve for the foaming agent, the method for determining the tangent line to the curve at the top of the peak, on the longer time side of the peak, is similar to the method described in "A. Method for producing product" above.

Also, the differential scanning calorimetry (DSC) to the adhesive composition is carried out by the following method. Firstly, 5.00 mg to 5.03 mg of the adhesive composition is weighed into a container. Then, using a differential scanning calorimeter, the temperature is raised and held under nitrogen gas flow rate of 20 ml/min and under heating conditions of rising temperature from room temperature to the maximum foaming temperature of the foaming agent in 5 minutes, and holding at the maximum foaming temperature of the foaming agent.

Incidentally, in the DSC curve for the adhesive composition, the method for determining the tangent line to the curve at the top of the exothermic peak, on the longer time side of the exothermic peak, is similar to the method described in “A. Method for producing product” above.

Also, the method for plotting the foaming ratio-time curve for the foaming agent and the DSC curve for the adhesive composition in one graph by overlaying these is similar to the method described in “A. Method for producing product” above.

Also, when the adhesive composition includes a plurality of foaming agents, at least one foaming agent may satisfy C<D. Among the above, among the plurality of foaming agents included in the adhesive composition, the foaming agent included in a large amount preferably satisfy C<D. In particular, all of the plurality of foaming agents included in the adhesive composition preferably satisfy C<D.

When the foaming ratio-time curve for the foaming agent includes a plurality of peaks, at least one peak may satisfy C<D. When the foaming ratio-time curve includes a plurality of peaks, the adhesive composition usually includes a plurality of foaming agents. Above all, all of these peaks preferably satisfy C<D.

Also, when the DSC curve for the adhesive composition includes a plurality of exothermic peaks due to the curing reaction of the thermosetting resin, at least one exothermic peak may satisfy C<D. When the DSC curve includes a plurality of exothermic peaks due to the curing reaction of the thermosetting resin, for example, the adhesive composition includes a plurality of thermosetting resins. Among the above, among the plurality of exothermic peaks due to the curing reaction of the thermosetting resin, an exothermic peak with small slope B preferably satisfy C<D. Particularly, all of these exothermic peaks preferably satisfy C<D.

The adhesive composition satisfies C<D. The relationship between C and D is similar to the relationship between A and B described in “A. Method for producing product” above.

Also, the method for controlling the slope C is similar to the method for controlling the slope A described in “A. Method for producing product” above.

Also, the method for controlling the slope D is similar to the method for controlling the slope B described in “A. Method for producing product” above.

Also, in the foaming ratio-time curve for the foaming agent, the time from the top of the peak (the point indicating 100% foaming ratio of the foaming agent) until the stabilization of the shrinkage of the foaming agent is similar to the contents described in “A. Method for producing product” above.

Also, in the DSC curve for the adhesive composition, the time from the top of the exothermic peak until it reaches the baseline is similar to the contents described in “A. Method for producing product” above.

The composition of the adhesive composition and the method for preparing thereof are similar to the contents described in “A. Method for producing product” above.

C. Foaming Adhesive Sheet

The foaming adhesive sheet in the present disclosure comprises an adhesive layer, wherein the adhesive layer includes the adhesive composition described above.

Since the adhesive composition is described in the section “B. Adhesive composition” above, the description herein is omitted.

Also, since the foaming adhesive sheet is described in the section “A. Method for producing product, 4. Foaming adhesive sheet” above, the description herein is omitted.

The foaming adhesive sheet in the present disclosure may include a separator.

The separator is not particularly limited as long as it may be peeled off from the adhesive layer, and may have a strength to the extent capable of protecting the adhesive layer. Examples of such separator may include a release film, and a release paper. Also, the separator may have a single layer structure, and may have a multiple layer structure.

Examples of the separator having a single layer structure may include a fluorine resin based film.

Also, examples of the separator having a multiple layer structure may include a stacked body including a release layer on one surface or on both surfaces of a substrate layer. Examples of the substrate layer may include resin films such as polypropylene, polyethylene, and polyethylene terephthalate; and paper such as high-quality paper, coated paper, and impregnated paper. The material of the release layer is not particularly limited as long as it has releasing property, and examples may include a silicone compound, an organic compound modified silicone compound, a fluorine compound, an amino-alkyd compound, a melamine compound, an acrylic compound, a polyester compound, and a long-chain alkyl compound. Any one of an emulsion type, a solvent type, and a solventless type of these compounds may be used.

The use application of the foaming adhesive sheet in the present disclosure is not particularly limited. Above all, the foaming adhesive sheet in the present disclosure is preferably used in the method for producing a product described above.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

EXAMPLES

Production Examples 1 to 3

Firstly, adhesive compositions 1 to 3 having the compositions shown in Table 1 below were prepared. Also, details of each material shown in Table 1 are shown below. Incidentally, the unit in Table 1 is “mass parts”.

- Acrylic resin: PMMA-PBuA-PMMA (partially acrylamide group), Tg: −20° C., 120° C., Mw: 150,000
- Epoxy resin A: bisphenol A novolac type, solid at ordinary temperature, softening temperature: 70° C., epoxy equivalent: 210 g/eq, Mw: 1300, melt viscosity at 150° C.: 0.5 Pa·s
- Epoxy resin B: BPA phenoxy type, solid at ordinary temperature, softening temperature: 110° C., epoxy equivalent: 8000 g/eq, Mw: 50,000
- Curing agent A: α-(hydroxy (or dihydroxy)phenylmethyl)-ω-hydropoly[biphenyl-4,4'-diylmethylene(hydroxy (or dihydroxy)phenylenemethylene)]
- Curing catalyst: 2-phenyl-4,5-dihydroxymethylimidazole, average particle size: 3 μm, melting point: 230° C., reaction start temperature: 145° C. to 155° C., active region: 155° C. to 173° C. (2PHZ-PW from Shikoku Chemicals Corporation)

Foaming agent: thermally expandable microcapsule, average particle size of 10 μm to 16 μm, expansion start temperature of 123° C. to 133° C., maximum expansion temperature of 168° C. to 178° C., core: hydrocarbon, shell: thermoplastic polymer Solvent: methyl ethyl ketone

TABLE 1

| | Production Ex. 1 (adh. composition 1) | Production Ex. 2 (adh. composition 2) | Production Ex. 3 (adh. composition 3) |
|---|---|---|---|
| Acrylic resin | 13 | 13 | 13 |
| Epoxy resin A | 40 | 40 | 40 |
| Epoxy resin B | 42 | 42 | 42 |
| Curing agent A | 6 | 6 | — |
| Curing catalyst | 8 | — | — |
| Foaming agent | 13.5 | 13.5 | 13.5 |
| Solvent | 150 | 150 | 150 |

A release film (PET separator PET50×1-J2 from Nippa Co., Ltd., thickness: 50 μm) was used. The adhesive composition was applied to the release-treated surface of the release film, using an applicator so that a thickness after application was 45 μm. Then, it was dried for 3 minutes at 100° C. in an oven to form an adhesive layer, thereby obtaining a foaming adhesive sheet.

[Evaluation 1]

(1) Differential Scanning Calorimetry to Foaming Agent

A differential scanning calorimetry was carried out to the foaming agent, using a differential scanning calorimeter including a camera ("high-sensitivity differential scanning calorimeter DSC7000X" from Hitachi High-Tech Science Corporation), under heating conditions of temperature rising time from room temperature to 180° C.: 5 minutes, and holding time at 180° C.: 15 minutes.

(2) Differential Scanning Calorimetry to Adhesive Composition

A differential scanning calorimetry was carried out to the adhesive layer including the adhesive composition, using a differential scanning calorimeter ("high-sensitivity differential scanning calorimeter DSC7000X" from Hitachi High-Tech Science Corporation), under heating conditions of temperature rising time from room temperature to 180° C.: 5 minutes, and holding time at 180° C.: 15 minutes.

(3) Relationship Between Slope A and Slope B

Figure 9A:
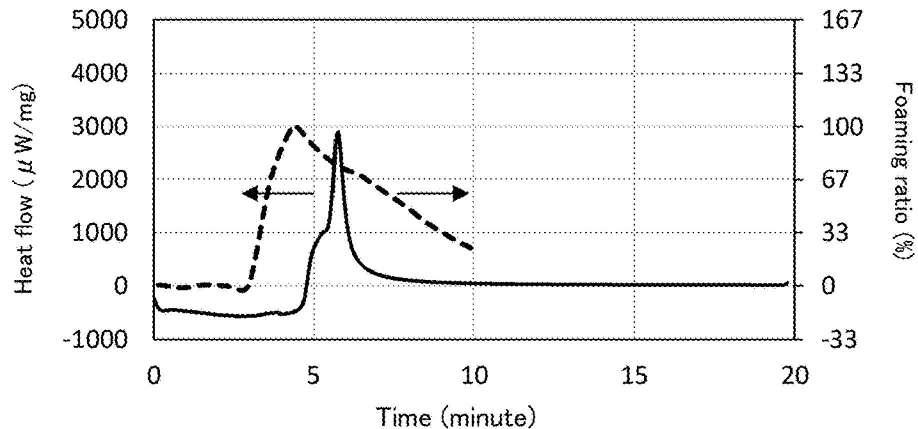
FIGS. 9A to 9C are graphs illustrating examples of the foaming ratio-time curve for the foaming agent and the DSC curve for the adhesive composition, of the adhesive composition in Producing Examples 1 to 3.
Figure 9B:
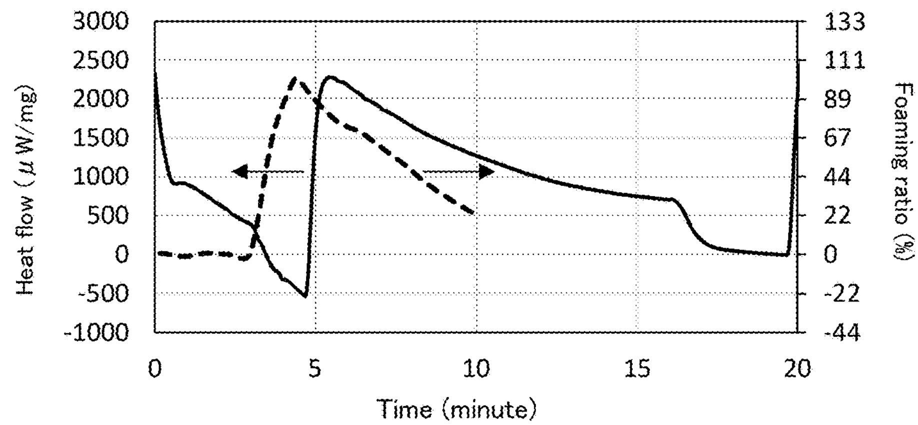
Figure 9C:
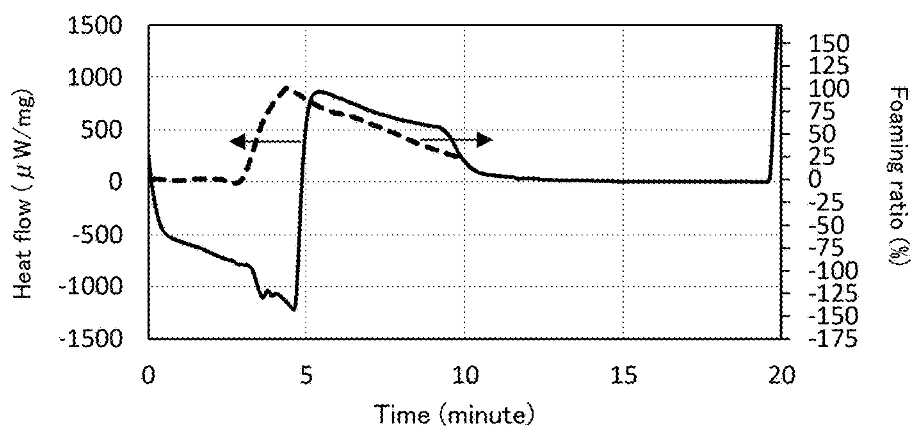

By the method described in "A. Method for producing product" above, the foaming ratio-time curve for the foaming agent and each of the DSC curve for each of the adhesive compositions 1 to 3 were overlaid to obtain graphs. The graphs are shown in FIGS. 9A to 9C. Also, in the foaming ratio-time curve for the foaming agent, the slope A of the tangent line to the curve at the top of the peak, on the longer time side of the peak, was determined by the method described in "A. Method for producing product" above. Also, in a DSC curve for the adhesive layer including the adhesive composition, the slope B of the tangent line to the curve at the top of the exothermic peak, on the longer time side of the exothermic peak, was determined by the method described in "A. Method for producing product" above.

(4) Adhesive Strength

Two cold rolled steel sheets SPCC-SD (length 100 mm×width 25 mm×thickness 1.6 mm) were prepared. Spacers (kapton tapes) were placed, on one steel sheet, at intervals of 15 mm. The thickness of the spacer was 140 μm (thickness of 2 stacked Kapton tapes P-221 from Nitto Denko Corporation). A foaming adhesive sheet was cut into a size of 12.5 mm×25 mm, the release film was peeled off, and the foaming adhesive sheet was placed between the spacers; the other steel sheet was placed on top thereof; and the resultant was fixed with a clip to obtain a test piece. The foaming adhesive sheet was cured by rising the temperature of the test piece from room temperature to 180° C. in 5 minutes, using an IR heater (a handy furnace from Advance Riko Inc.), and heating at 180° C. for 30 minutes. The shear strength (adhesive strength) of the heated test piece was measured by a Tensilon RTF1350 (from A & D Company, Ltd.) according to JIS K6850. The tensile speed was 10 mm/min, and temperature was 23° C.

TABLE 2

| | Temperature rising time (minute) | Holding time (minute) | Adhesive strength (MPa) | Relation between slope A & slope B | Remarks |
|---|---|---|---|---|---|
| Prod. Ex. 1 | 5 | 15 | 3.0 | A < B | Inv. Ex. |
| Prod. Ex. 2 | 5 | 15 | 1.9 | A > B | Comp. Ex. |
| Prod. Ex. 3 | 5 | 15 | 1.9 | A > B | Comp. Ex. |

Production Example 4

Firstly, adhesive composition 4 having the following composition was prepared.

<Composition of Adhesive Composition 4>

Acrylic resin (PMMA-PBuA-PMMA (partially acrylamide group), Tg: −20° C., 120° C., Mw: 150,000): 40 mass parts Epoxy resin C (bisphenol A type, liquid at ordinary temperature, epoxy equivalent: 184 to 194 g/eq): 45 mass parts Epoxy resin D (diaminodiphenyl methane type, high viscosity liquid, epoxy equivalent: 110 to 130 g/eq): 65 mass parts Epoxy resin E (silicone modified, epoxy equivalent: 1200 g/mol): 20 mass parts Silane coupling agent (3-glycidoxypropyltrimethoxysilane): 2 mass parts Curing agent B (phenol-formaldehyde polycondensate, softening temperature: 80° C., hydroxyl group equivalent: 104 g/mol): 6 mass parts Curing catalyst (2-phenyl-4,5-dihydroxymethylimidazole, average particle size: 3 μm, melting point: 230° C., reaction start temperature: 145° C. to 155° C., active region: 155° C. to 173° C. (2PHZ-PW from Shikoku Chemicals Corporation): 10 mass parts Foaming agent (thermally expandable microcapsule, average particle size of 10 μm to 16 μm, expansion start temperature of 123° C. to 133° C., maximum expansion temperature of 168° C. to 178° C., core: hydrocarbon, shell: thermoplastic polymer): 20 mass parts Solvent (methyl ethyl ketone) 114 mass parts As a substrate, polyethylene naphthalate (PEN film, Teonex Q51 from Toyobo Film Solutions, thickness: 25 μm) was used. The adhesive composition 1 used in Production Example 1 above was applied on one surface of the substrate, using an applicator so that a thickness after application was 45 μm. Thereafter, it was dried for 3 minutes at 100° C. in an oven to form a first adhesive layer.

Then, as a second separator, a release film (PET separator PET50×1-J2 from Nippa Co., Ltd., thickness: 50 μm) was used, adhesive composition 4 was applied to the release-treated surface of the release film, using an applicator so that a thickness after application was 45 pam. Thereafter, it was dried for 3 minutes at 100° C. in an oven to form a second adhesive layer.

Then, on the substrate side surface of the stacked body including the substrate and the first adhesive layer, the second adhesive layer side surface of the stacked body including the second separator and the second adhesive layer was laminated. Thereby obtained a foaming adhesive sheet wherein the first adhesive layer, substrate, second adhesive layer and second separator were placed in this order.

[Evaluation 2]

(1) Differential Scanning Calorimetry to Foaming Agent

A differential scanning calorimetry was carried out to the foaming agent, using a differential scanning calorimeter including a camera ("high-sensitivity differential scanning calorimeter DSC7000X" from Hitachi High-Tech Science Corporation), under heating conditions of temperature rising time from room temperature to 180° C.: 1 minute or more and 65 minutes or less, and holding time at 180° C.: 30 minutes.

(2) Differential Scanning Calorimetry to Composition where Foaming Agent is Excluded from Adhesive Composition For the adhesive compositions 1 and 4, a differential scanning calorimetry was carried out to the composition where the foaming agent is excluded from each adhesive composition, using a differential scanning calorimeter ("high-sensitivity differential scanning calorimeter DSC7000X" from Hitachi High-Tech Science Corporation), under heating conditions of temperature rising time from room temperature to 180° C.: 1 minute or more and 65 minutes or less, and holding time at 180° C.: 30 minutes.

(3) Relationship Between Time T1 and Time T2

Figure 10A:
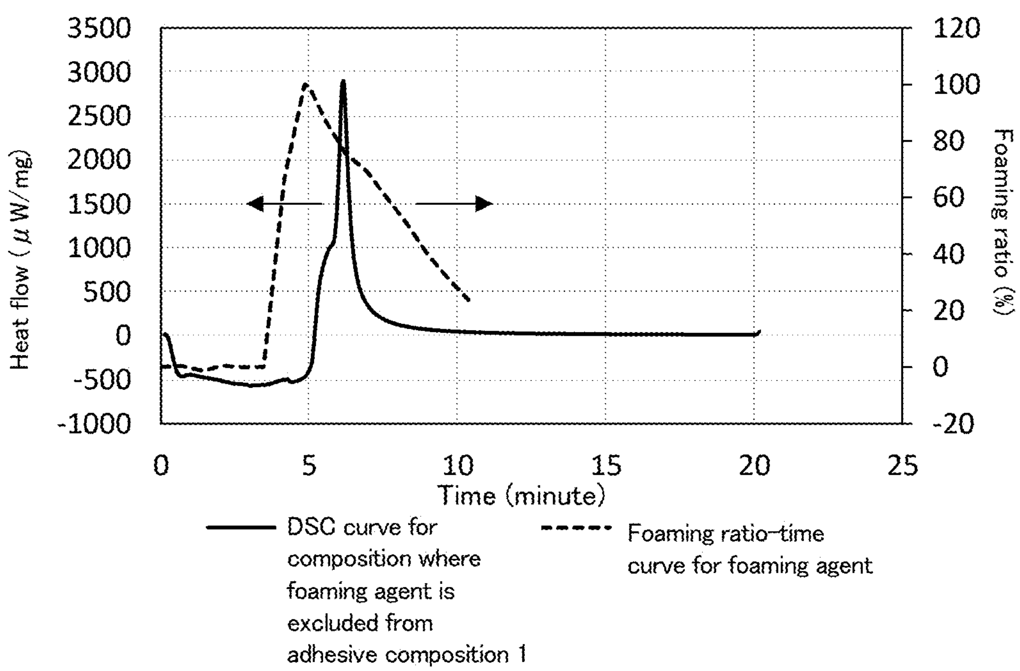
FIGS. 10A and 10B are graphs illustrating examples of the foaming ratio-time curve for the foaming agent and the DSC curve for the composition where the foaming agent is excluded from the adhesive composition, of the adhesive composition 1.
Figure 10B:
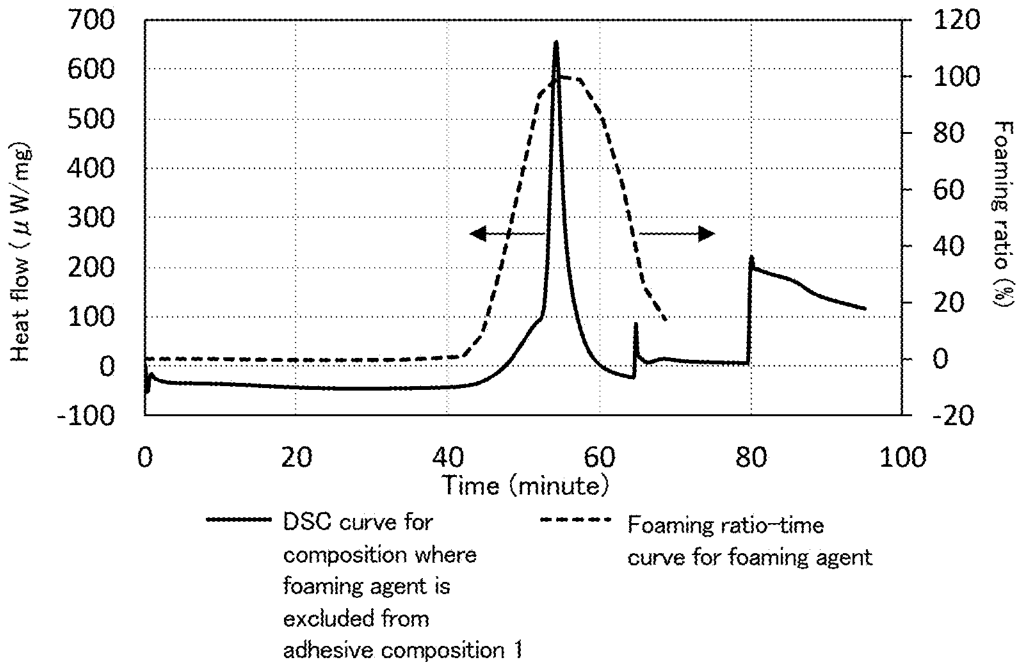
Figure 11A:
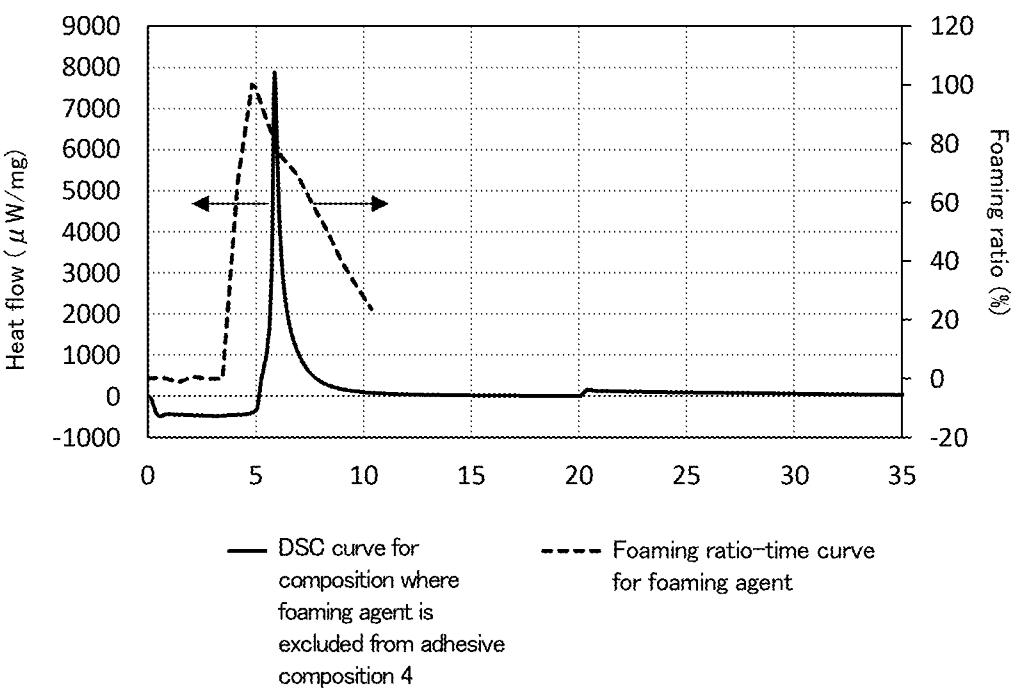
FIGS. 11A and 11B are graphs illustrating examples of the foaming ratio-time curve for the foaming agent and the DSC curve for the composition where the foaming agent is excluded from the adhesive composition, of the adhesive composition 4.
Figure 11B:
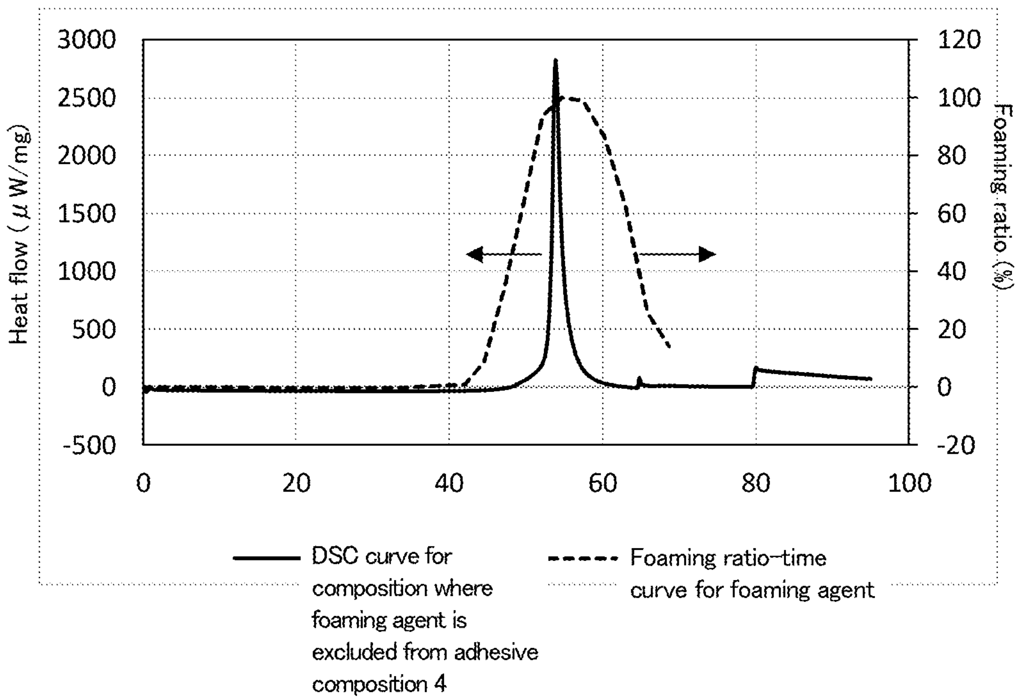

For each of the heating conditions, the foaming ratio-time curve for the foaming agent and the DSC curve for the composition where the foaming agent is excluded from each of the adhesive compositions, were overlaid to obtain graphs. For the adhesive composition 1, graphs when the temperature rising time was 5 minutes and 65 minutes respectively are shown in FIGS. 10A and 10B. Also, for the adhesive composition 4, graphs when the temperature rising time was 5 minutes and 65 minutes respectively are shown in FIGS. 10A and 10B. Also, in the foaming ratio-time curve for the foaming agent, the time T1 corresponding to the top of the peak was determined. Also, in a DSC curve for the composition where the foaming agent was excluded from the adhesive composition, the time T2 corresponding to the top of the exothermic peak was determined.

(4) Adhesive Strength

Two cold rolled steel sheets SPCC-SD (length 100 mm×width 25 mm×thickness 1.6 mm) were prepared. Spacers (kapton tapes or fluorine tapes) were placed, on one steel sheet, at intervals of 15 mm. The thickness of the spacer was approximately 370 μm (thickness of two Kapton tapes P-221 from Nitto Denko Corporation and one fluorine resin pressure-sensitive adhesive tape 8410 from Teraoka Seisakusho Co., Ltd. stacked together). A foaming adhesive sheet was cut into a size of 12.5 mm×25 mm, the second separator was peeled off, and the foaming adhesive sheet was placed between the spacers; the other steel sheet was placed on top thereof; and the resultant was fixed with a clip to obtain a test piece. The foaming adhesive sheet was cured by rising the temperature of the test piece from room temperature to 180° C. in 1 minute or more and 65 minutes or less, using an IR heater (a handy furnace from Advance Riko Inc.), and heating at 180° C. for 30 minutes. The shear strength (adhesive strength) of the heated test piece was measured by a Tensilon RTF1350 (from A & D Company, Ltd.) according to JIS K6850. The tensile speed was 10 mm/min, and temperature was 23° C.

TABLE 3

| | Temp. rising time (minute) | Holding time (minute) | Adh. Composition 1 Relation between time T1 & time T2 | Adh. Composition 4 Relation between time T1 & time T2 | Adhesive strength (MPa) | Remarks |
|---|---|---|---|---|---|---|
| Prod. Ex. 4 | 1 | 30 | T1 < T2 | T1 < T2 | 2.0 | Inv. Ex. |
| | 5 | 30 | T1 < T2 | T1 < T2 | 1.9 | Inv. Ex. |
| | 15 | 30 | T1 < T2 | T1 < T2 | 2.1 | Inv. Ex. |
| | 30 | 30 | T1 < T2 | T1 < T2 | 1.7 | Inv. Ex. |
| | 65 | 30 | T1 > T2 | T1 > T2 | 0.3 | Comp. Ex. |

It was confirmed from Table 2 and Table 3 that the adhesive strength was improved when the adhesive composition satisfies A<B, and also the adhesive composition was heated so that T1<T2 in the adhering step.

[Evaluation 3]

(1) Maximum Foaming Temperature of Foaming Agent

A differential scanning calorimetry was carried out to the foaming agent, using a differential scanning calorimeter including a camera ("high-sensitivity differential scanning calorimeter DSC7000X" from Hitachi High-Tech Science Corporation) at temperature rising rate of 31° C./min. In the foaming ratio-time curve for the foaming agent, the temperature corresponding to the top of the peak was regarded as the maximum foaming temperature. The maximum foaming temperature was 174.5° C.

(2) Differential Scanning Calorimetry to Foaming Agent

A differential scanning calorimetry was carried out to the foaming agent, using a differential scanning calorimeter including a camera ("high-sensitivity differential scanning calorimeter DSC7000X" from Hitachi High-Tech Science Corporation), under heating conditions of temperature rising time from room temperature to the maximum foaming temperature (174.5° C.): 5 minutes, and holding time at the maximum foaming temperature (174.5° C.): 15 minutes.

(3) Differential Scanning Calorimetry to Adhesive Composition

A differential scanning calorimetry was carried out to the adhesive layer including the adhesive compositions 1 to 3 used in Production Examples 1 to 3, using a differential scanning calorimeter ("high-sensitivity differential scanning calorimeter DSC7000X" from Hitachi High-Tech Science Corporation), under heating conditions of temperature rising time from room temperature to the maximum foaming temperature (174.5° C.): 5 minutes, and holding time at the maximum foaming temperature (174.5° C.): 15 minutes.

(4) Relationship Between Slope C and Slope D

By the method described in "A. Method for producing product" above, the foaming ratio-time curve for the foaming agent and each of the DSC curves for each of the adhesive compositions were overlaid to obtain graphs. Also, in the foaming ratio-time curve for the foaming agent, the slope C of the tangent line to the curve at the top of the peak, on the longer time side of the peak, was determined by the method described in "A. Method for producing product" above. Also, in a DSC curve for the adhesive layer including the adhesive composition, the slope D of the tangent line to the curve at the top of the exothermic peak, on the longer time side of the exothermic peak, was determined by the method described in "A. Method for producing product" above.

(5) Adhesive Strength

The adhesive strength was measured by the same method as the method described in the Evaluation 1 above.

It was confirmed that the adhesion strength was improved when $C<D$ was satisfied.

[Evaluation 4]

(1) Adhesive Strength

For the foaming adhesive sheet in Production Example 4, the adhesive strength was measured by the same method as the method described in the Evaluation 2 above. In doing so, the foaming adhesive sheet was heated under heating conditions of temperature rising time from room temperature to the heating temperature: 15 minutes, heating temperature: 150° C. or more and 200° C. or less, and holding time at the heating temperature: 0 minute or more and 120 minutes or less. The results are shown in FIG. 12.

Also, after measuring the adhesive strength, the cohesion failure ratio was calculated. The cohesion failure ratio is the ratio of the area of the cohesion failure portion with respect to the total adhesion area. The results are shown in FIG. 13.

Figure 12:
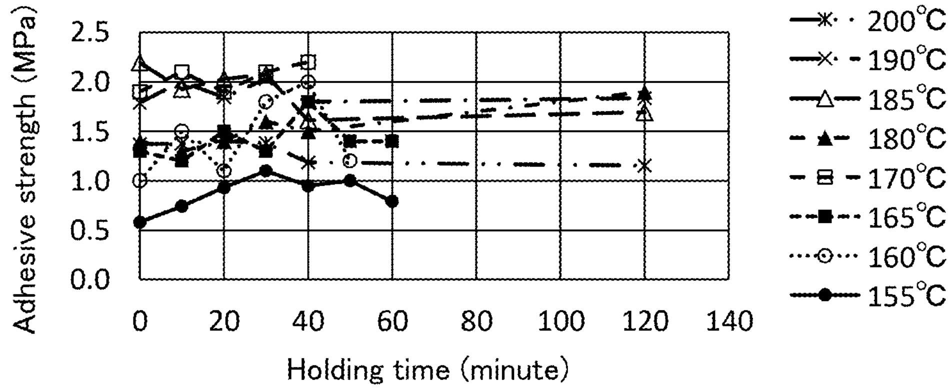
FIG. 12 is a graph illustrating the heating time and the relationship between the holding time and the adhesive strength at each heating temperature.
Figure 13:
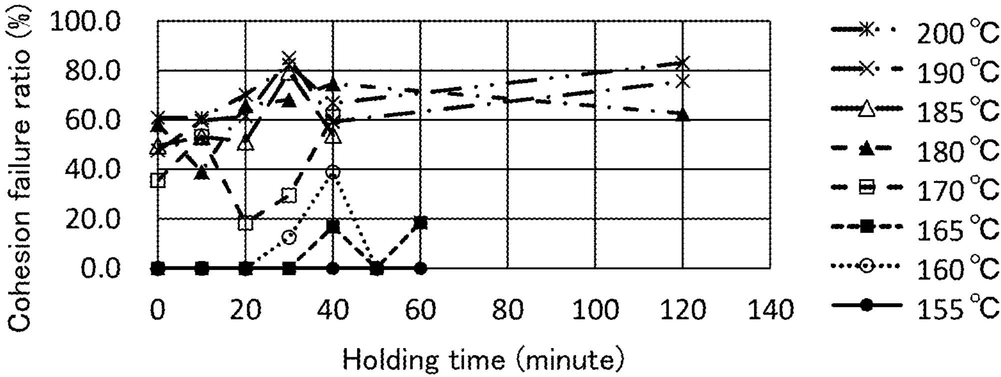
FIG. 13 is a graph illustrating the heating time and the relationship between the holding time and the cohesion failure ratio at each heating temperature.

From FIG. 12 and FIG. 13, it was suggested that there was a preferable range of the heating temperature.

REFERENCE SIGNS LIST

1: adhesive layer
1*a*: first adhesive layer
1*b*: second adhesive layer
2: substrate
10: foaming adhesive sheet
11: adhesive sheet after foamed and cured
20*a*: first member
20*b*: second member
100: product

The invention claimed is:

1. A method for producing a product, the method comprising:

a placing step of placing an adhesive composition, including a thermosetting resin and a foaming agent, between a first member and a second member; and an adhering step of adhering the first member and the second member by foaming and curing the adhesive composition by heating, wherein the foaming agent is a thermally expandable microcapsule;

$A<B$ when following conditions are satisfied, in a foaming ratio-time curve where time is on a horizontal axis and a foaming ratio of the foaming agent is on a vertical axis, when a differential scanning calorimetry is carried out to the foaming agent, using a differential scanning calorimeter including a camera, under heating conditions in the adhering step, a slope of a tangent line to the curve at a top of a peak, on a longer time side of the peak, is regarded as A, and in a DSC curve where time is on a horizontal axis and a heat flow is on a vertical axis, when a differential scanning calorimetry is carried out to the adhesive composition under the heating conditions in the adhering step, a slope of a tangent line to the curve at a top of an exothermic peak, on a longer time side of the exothermic peak, is regarded as B; and the adhesive composition is heated so that $T1<T2$ when following conditions are satisfied in the adhering step, in a foaming ratio-time curve where time is on a horizontal axis and a foaming ratio of the foaming agent is on a vertical axis, when a differential scanning calorimetry is carried out to the foaming agent, using a differential scanning calorimeter including a camera, time corresponding to a top of a peak is regarded as T1, and in a DSC curve where time is on a horizontal axis and a heat flow is on a vertical axis, when a differential scanning calorimetry is carried out to a composition where the foaming agent is excluded from the adhesive composition, time corresponding to a top of an exothermic peak is regarded as T2.

2. The method for producing a product according to claim 1, wherein a heating temperature in the adhering step is in a range of ±20° C. of a maximum foaming temperature of the foaming agent.

3. The method for producing a product according to claim 1, wherein, in the placing step, a foaming adhesive sheet including an adhesive layer including the adhesive composition is used, and the foaming adhesive sheet is placed between the first member and the second member.

4. An adhesive composition comprising a thermosetting resin and a foaming agent, wherein the foaming agent is a thermally expandable microcapsule;

$C<D$ when following conditions are satisfied, in a foaming ratio-time curve where time is on a horizontal axis and a foaming ratio of the foaming agent is on a vertical axis, when a differential scanning calorimetry is carried out to the foaming agent, using a differential scanning calorimeter including a camera, under heating conditions of rising temperature from room temperature to a maximum foaming temperature of the foaming agent in 5 minutes, and holding at the maximum foaming temperature of the foaming agent, a slope of a tangent line to the curve at a top of a peak, on a longer time side of the peak, is regarded as C, and in a DSC curve where time is on a horizontal axis and a heat flow is on a vertical axis, when a differential scanning calorimetry is carried out to the adhesive composition under the heating conditions described above, a slope of a tangent line to the curve at a top of an exothermic peak, on a longer time side of the exothermic peak, is regarded as D; and the adhesive composition is used by heating thereof so that T1<T2 when following conditions are satisfied, in a foaming ratio-time curve where time is on a horizontal axis and a foaming ratio of the foaming agent is on a vertical axis, when a differential scanning calorimetry is carried out to the foaming agent, using a differential scanning calorimeter including a camera, time corresponding to a top of a peak is regarded as T1, and in a DSC curve where time is on a horizontal axis and a heat flow is on a vertical axis, when a differential scanning calorimetry is carried out to a composition where the foaming agent is excluded from the adhesive composition, time corresponding to a top of an exothermic peak is regarded as T2.

5. A foaming adhesive sheet comprising an adhesive layer, wherein the adhesive layer includes the adhesive composition according to claim 4.

* * * * *